(12) United States Patent
Fujinawa et al.

(10) Patent No.: US 11,755,153 B2
(45) Date of Patent: Sep. 12, 2023

(54) INFORMATION PROCESSING APPARATUS FOR CONTROLLING OPERATION PATTERN

(71) Applicant: SONY GROUP CORPORATION, Tokyo (JP)

(72) Inventors: Eisuke Fujinawa, Tokyo (JP); Tetsuo Ikeda, Tokyo (JP); Seishi Tomonaga, Kanagawa (JP); Junji Otsuka, Kanagawa (JP); Atsushi Irie, Kanagawa (JP); Yugo Sato, Kanagawa (JP); Kenji Gotoh, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 145 days.

(21) Appl. No.: 17/420,284

(22) PCT Filed: Jan. 22, 2020

(86) PCT No.: PCT/JP2020/002030
§ 371 (c)(1),
(2) Date: Jul. 1, 2021

(87) PCT Pub. No.: WO2020/162169
PCT Pub. Date: Aug. 13, 2020

(65) Prior Publication Data
US 2022/0091695 A1    Mar. 24, 2022

(30) Foreign Application Priority Data

Feb. 5, 2019  (JP) ................................. 2019-018921

(51) Int. Cl.
*G06F 3/042* (2006.01)
*G06F 3/041* (2006.01)
(Continued)

(52) U.S. Cl.
CPC .......... *G06F 3/0425* (2013.01); *G06F 3/0416* (2013.01)

(58) Field of Classification Search
USPC ........................................................ 345/175
See application file for complete search history.

(56) References Cited

U.S. PATENT DOCUMENTS

2010/0277428 A1* 11/2010 Kumazawa ............. G06F 3/038
                                                                     345/173
2011/0197263 A1*  8/2011 Stinson, III ............. G06F 3/017
                                                                     715/753
(Continued)

FOREIGN PATENT DOCUMENTS

JP    2012-048623 A    3/2012
JP    2016-522525 A    7/2016
(Continued)

*Primary Examiner* — Chineyere D Wills-Burns
(74) *Attorney, Agent, or Firm* — Paratus Law Group, PLLC

(57) ABSTRACT

There is provided an information processing apparatus, an information processing method, and a program for enabling improvement of operability in a case of performing a user operation on surfaces of various real objects. The information processing apparatus includes an operation pattern control unit configured to control an operation pattern in an operation area on a surface of a real object on the basis of information indicating a characteristic of the operation area. The operation pattern includes, for example, at least one of a method of inputting operation data in the operation area or a method of detecting the operation data. The present technology can be applied to, for example, a system using augmented reality (AR).

20 Claims, 35 Drawing Sheets

(51) Int. Cl.

| | |
|---|---|
| *G06F 3/04815* | (2022.01) |
| *G06F 3/04847* | (2022.01) |
| *G06F 3/0486* | (2013.01) |
| *G06F 3/04883* | (2022.01) |
| *G06F 3/01* | (2006.01) |
| *G06F 3/0488* | (2022.01) |

(56) References Cited

U.S. PATENT DOCUMENTS

| | | | |
|---|---|---|---|
| 2012/0032979 A1* | 2/2012 | Blow | G06F 1/1626 345/173 |
| 2014/0049483 A1* | 2/2014 | Kim | G06F 3/0488 345/173 |
| 2014/0359528 A1* | 12/2014 | Murata | G06F 3/04842 715/833 |
| 2015/0261431 A1* | 9/2015 | Ohtsuka | G06F 3/0486 345/173 |
| 2015/0346864 A1* | 12/2015 | Yang | G06F 3/04186 345/174 |
| 2015/0355812 A1* | 12/2015 | Onishi | G06F 3/04842 715/762 |
| 2016/0034039 A1* | 2/2016 | Maeda | G06F 3/04842 715/810 |
| 2018/0217672 A1* | 8/2018 | Ito | G02B 27/0172 |

FOREIGN PATENT DOCUMENTS

| | | |
|---|---|---|
| JP | 2019-029804 A | 2/2019 |
| WO | WO 2014/112419 A1 | 7/2014 |

\* cited by examiner

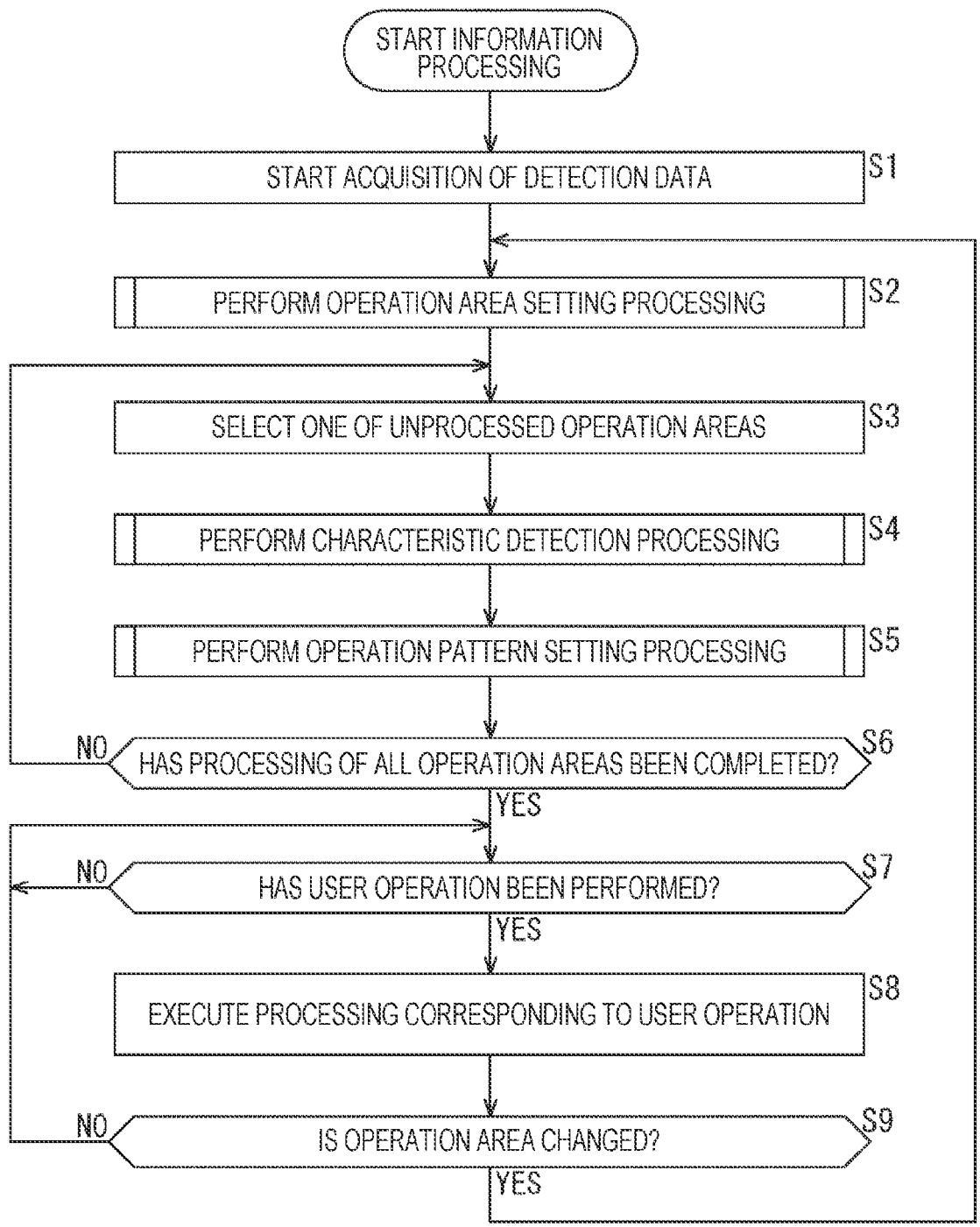

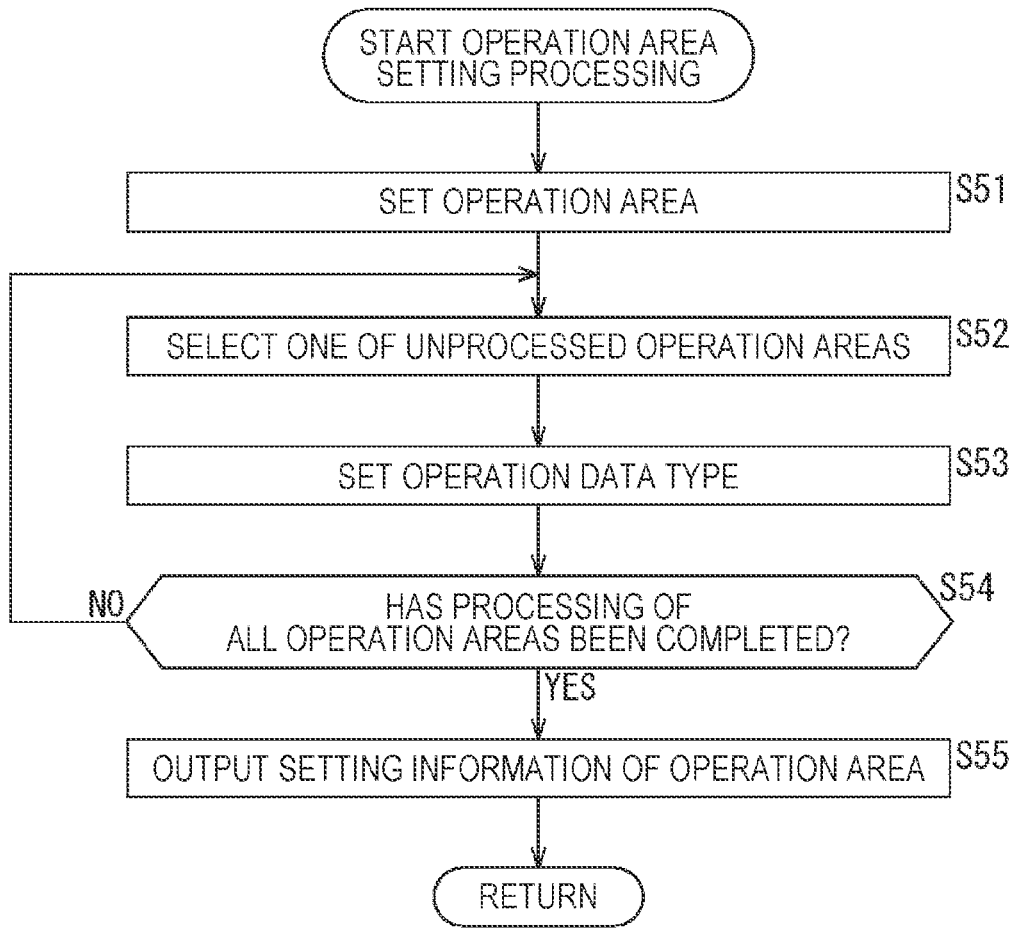

FIG. 10

| MATERIAL NAME | FRICTIONAL FORCE | ELASTICITY | BRITTLENESS | DIRTINESS | TEMPERATURE |
|---|---|---|---|---|---|
| WOOD | | | | | |
| RUBBER | | | | | |
| GLASS | | | | | |
| CERAMICS | | | | | |
| PLASTIC | | | | | |
| ... | | | | | |

FIG. 11

| CHARACTERISTIC PARAMETER NAME | MEASURING METHOD |
|---|---|
| FRICTIONAL FORCE | ESTIMATED ON BASIS OF VELOCITY OF USER'S FINGER RUBBING SURFACE OF OBJECT OR VIBRATION OF FINGERTIP |
| ELASTICITY | ESTIMATED ON BASIS OF POSITION OF USER'S FINGER PUSHING SURFACE OF OBJECT OR DEFORMATION OF OBJECT |
| BRITTLENESS | ESTIMATED ON BASIS OF STATE WHEN TOUCHING OBJECT WITH HAND |
| DIRTINESS | ESTIMATED BY IMAGE RECOGNITION |
| TEMPERATURE | MEASURED BY THERMOGRAPHY OR TEMPERATURE SENSOR OR ESTIMATED BY IMAGE RECOGNITION |

FIG. 17

| OPERATION DATA TYPE | OPERATION SYSTEM A | OPERATION SYSTEM B | OPERATION SYSTEM C | OPERATION SYSTEM D |
|---|---|---|---|---|
| BINARY TYPE | TOUCH | PUSHING | TOUCH | LONG-TIME HOVER |
| CONTINUOUS VALUE TYPE | TOUCH<br>INCLINATION OF FINGER | PUSHING<br>PUSHING AMOUNT | DRAG<br>MOVING DISTANCE | LONG-TIME HOVER<br>HEIGHT |
| DIRECTIONAL TYPE | TOUCH<br>ORIENTATION OF FINGER | PUSHING<br>PUSHING DIRECTION | SWIPE<br>MOVING DIRECTION | LONG-TIME HOVER<br>ORIENTATION OF FINGER |
| VECTOR TYPE | TOUCH<br>INCLINATION OF FINGER<br>ORIENTATION OF FINGER | PUSHING<br>PUSHING AMOUNT<br>PUSHING DIRECTION | DRAG<br>MOVING DISTANCE<br>MOVING DIRECTION | LONG-TIME HOVER<br>HEIGHT<br>ORIENTATION OF FINGER |

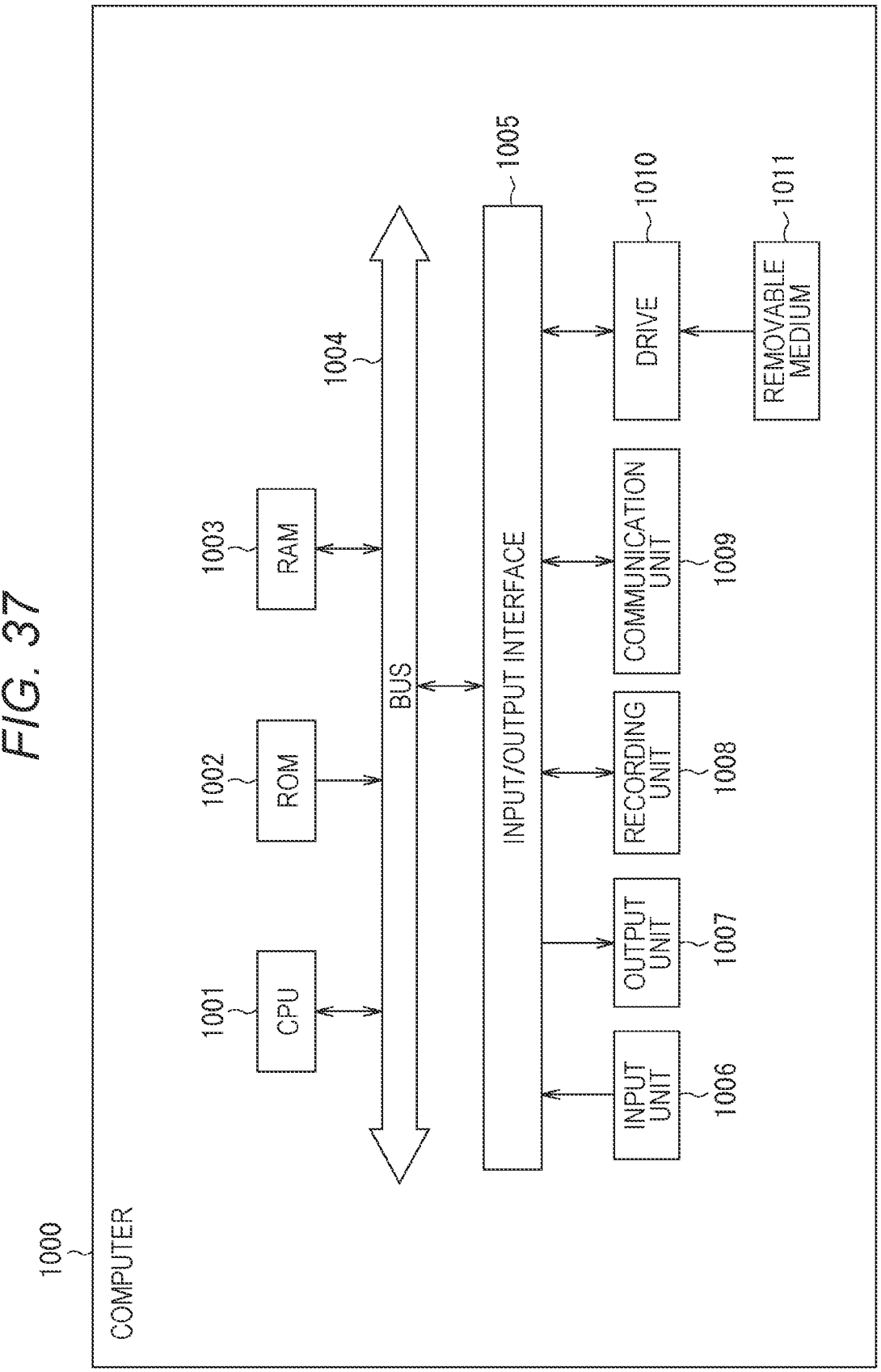

INFORMATION PROCESSING APPARATUS FOR CONTROLLING OPERATION PATTERN

CROSS REFERENCE TO PRIOR APPLICATION

This application is a National Stage Patent Application of PCT International Patent Application No. PCT/JP2020/002030 (filed on Jan. 22, 2020) under 35 U.S.C. § 371, which claims priority to Japanese Patent Application No. 2019-018921 (filed on Feb. 5, 2019), which are all hereby incorporated by reference in their entirety.

TECHNICAL FIELD

The present technology relates to an information processing apparatus, an information processing method, and a program, and in particular to an information processing apparatus, an information processing method, and a program for enabling improvement of operability in a case of performing a user operation on surfaces of various real objects.

BACKGROUND ART

Conventionally, it has been proposed to set drawing parameters such as density, thickness, and bleeding according to a moving velocity, a contact area, and a pressing force of an operation object in a case of performing drawing processing on a pressure-sensitive touch panel (see, for example, Patent Document 1).

CITATION LIST

Patent Document

Patent Document 1: Japanese Patent Application Laid-Open No. 2012-48623

SUMMARY OF THE INVENTION

Problems to be Solved by the Invention

By the way, in a system using augmented reality (AR), it is assumed to perform a user operation on surfaces of various real objects around the body, for example. For example, it is assumed to project an operation screen on a table and perform a user operation using the operation screen. In contrast, in Patent Document 1, it is not assumed to perform a user operation on a surface of a real object other than the pressure-sensitive touch panel.

The present technology has been made in view of the foregoing, and is intended to improve the operability in the case of performing a user operation on surfaces of various real objects.

Solutions to Problems

An information processing apparatus according to one aspect of the present technology includes an operation pattern control unit configured to control an operation pattern in an operation area on a surface of a real object on the basis of information indicating a characteristic of the operation area.

An information processing method according to one aspect of the present technology includes, by an information processing apparatus, controlling an operation pattern in an operation area on a surface of a real object on the basis of information indicating a characteristic of the operation area.

A program according to one aspect of the present technology causes a computer to execute processing of controlling an operation pattern in an operation area on a surface of a real object on the basis of information indicating a characteristic of the operation area.

In one aspect of the present technology, an operation pattern in an operation area on a surface of a real object is controlled on the basis of information indicating a characteristic of the operation area.

BRIEF DESCRIPTION OF DRAWINGS

FIG. 5 is a flowchart for describing information processing.

FIG. 6 is a flowchart for describing details of operation area setting processing.

FIG. 7 is a diagram illustrating an example of an operation area definition table.

FIG. 10 is a diagram illustrating an example of a material definition table.

FIG. 11 is a diagram illustrating an example of a characteristic measurement definition table.

FIG. 17 is a diagram illustrating an example of an operation system definition table.

FIG. 37 is a diagram illustrating a configuration example of a computer.

MODE FOR CARRYING OUT THE INVENTION

Hereinafter, modes for carrying out the present technology will be described. Description will be given in the following order.
1. Embodiment
2. Application
3. Modification
4. Others 1. Embodiment Next, an embodiment of the present technology will be described with reference to FIGS. 1 to 23.

Configuration Example of Information Processing System 1

Figure 1:
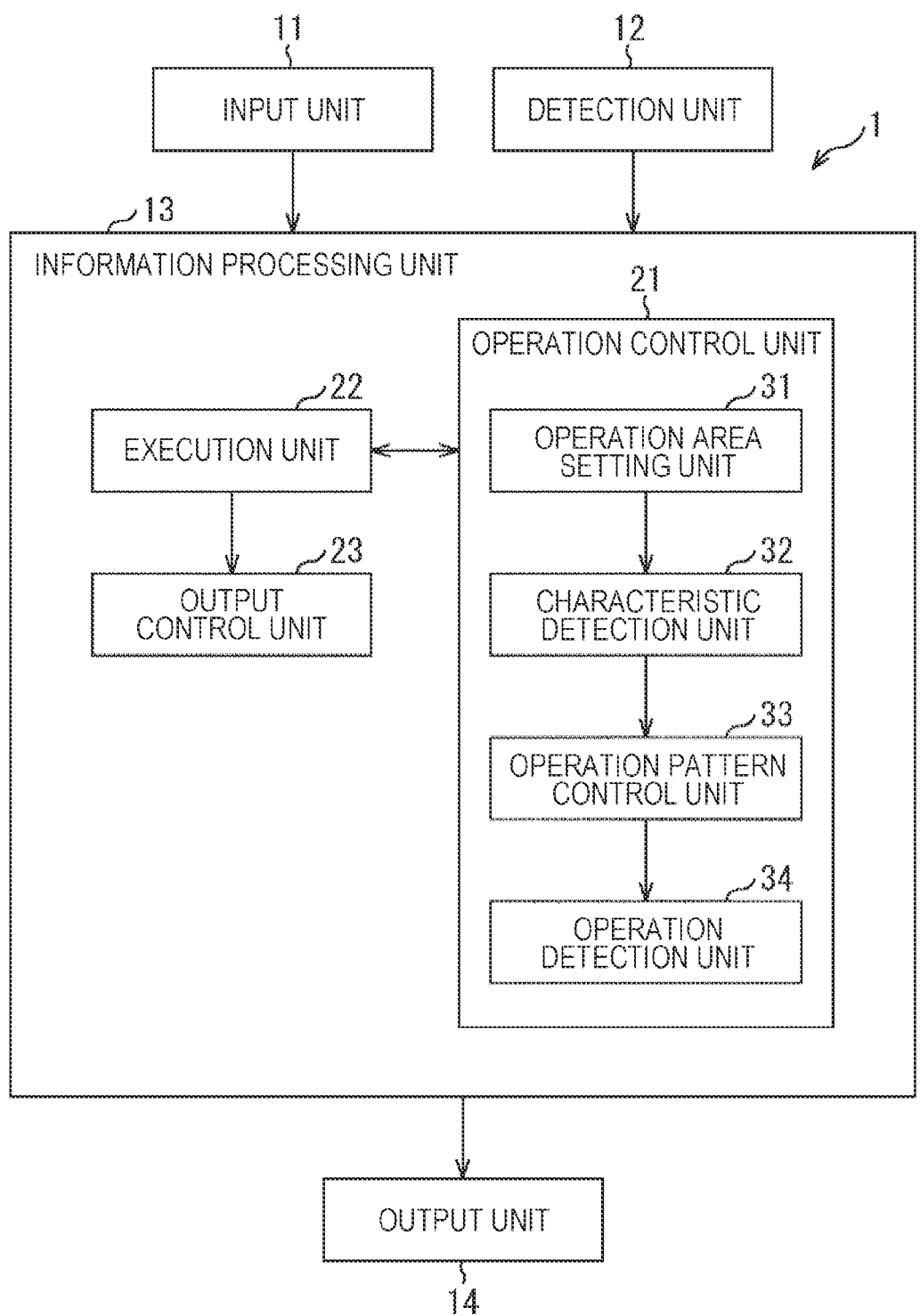
FIG. 1 is a block diagram illustrating an embodiment of an information processing system to which the present technology is applied.

FIG. 1 is a block diagram illustrating a configuration example of an information processing system 1 to which the present technology is applied. The information processing system 1 is, for example, a system that implements various functions using AR.

The information processing system 1 includes an input unit 11, a detection unit 12, an information processing unit 13, and an output unit 14.

The input unit 11 includes an input device for inputting instructions and data to the information processing unit 13. The input unit 11 supplies the input input data to the information processing unit 13. Note that either wired communication or wireless communication may be used for transferring data between the input unit 11 and the information processing unit 13.

The detection unit 12 is provided with various sensors for example, and detects data regarding a real object (hereinafter referred to as an operation object) used for user operation and a real object (hereinafter referred to as an object to be operated) for which the user operation is performed. For example, the detection unit 12 detects data regarding the position, shape, and the like of the operation object and data regarding the position, shape, texture, and the like of the object to be operated. The detection unit 12 supplies detection data including data regarding the operation object and the object to be operated to the information processing unit 13. Note that either wired communication or wireless communication may be used for transferring data between the detection unit 12 and the information processing unit 13.

Note that the operation object is assumed to be a part of a user's body such as a finger, but may be, for example, a real object other than the user's body. As a real object other than the user's body, for example, various operation devices (for example, a digital pen), a stick, or the like is assumed. Note that, hereinafter, the case where the user's finger is mainly used as the operation object will be described as an example.

Furthermore, as the object to be operated, various real objects around the user can be used, as will be described below.

Moreover, hereinafter, in a case where it is not necessary to clearly distinguish the real object, which is an object in reality, from a virtual object, the real object will be simply referred to as an object.

Furthermore, the detection unit 12 includes, for example, a camera or an image sensor capable of acquiring a two-dimensional or three-dimensional image. For example, the detection unit 12 includes a visible light camera, an infrared camera, a stereo camera, a depth camera, or the like. Note that the method of the depth camera is arbitrary, and for example, the depth camera in a time of flight method or a structured light method is used. Furthermore, the detection unit 12 includes, for example, a touch sensor, an ultrasonic sensor, a thermography, a temperature sensor, a bending sensor, a pressure sensor, a depth sensor, or the like.

The information processing unit 13 performs various types of information processing on the basis of the input data and the detection data. The information processing unit 13 includes an operation control unit 21, an execution unit 22, and an output control unit 23.

The operation control unit 21 performs various controls for implementing user operations on a surface of the object to be operated. The user operation on the surface of the object to be operated includes not only an operation performed by causing the operation object to directly come in contact with the surface of the object to be operated but also an operation performed without causing the operation object to come in contact with the object to be operated at a position distant from the surface of the object to be operated.

The operation control unit 21 includes an operation area setting unit 31, a characteristic detection unit 32, an operation pattern control unit 33, and an operation detection unit 34.

The operation area setting unit 31 sets an area (hereinafter referred to as an operation area) in which the user operation is performed for the object to be operated on the basis of the detection data. Furthermore, the operation area setting unit 31 sets a type (hereinafter referred to as an operation data type) of data (hereinafter referred to as operation data) input by the user operation in the operation area. The operation area setting unit 31 supplies operation area setting information to the characteristic detection unit 32.

The characteristic detection unit 32 detects the characteristic of the operation area on the basis of the detection data.

The characteristic of the operation area includes, for example, at least one of a property or a state of the operation area. The property of the operation area is represented by, for example, a property of the object to be operated that constitutes the operation area, and includes, for example, at least one of elasticity, frictional force, or brittleness. The state of the operation area includes, for example, at least one of dirt or temperature. The characteristic detection unit 32 supplies information indicating the characteristic of the operation area to the operation pattern control unit 33.

Furthermore, the characteristic detection unit 32 instructs the execution unit 22 to execute measurement of the characteristic of the operation area, for example.

The operation pattern control unit 33 controls an operation pattern in the operation area on the basis of the detection data and the information indicating the characteristic of the operation area. The operation pattern includes, for example, at least one of a method of inputting the operation data or a method of detecting the operation data. The operation pattern control unit 33 supplies information indicating the operation pattern to be applied to the operation area to the execution unit 22 and the operation detection unit 34.

The operation detection unit 34 performs user operation detection processing on the basis of the detection data and the operation pattern. The operation detection unit 34 supplies the operation data obtained by the detection processing to the execution unit 22.

The execution unit 22 executes various types of processing on the basis of the input data, the detection data, the operation data, the operation pattern, and the like. The execution unit 22 supplies data indicating an execution result of the processing to the operation control unit 21 and the output control unit 23. Furthermore, for example, the execution unit 22 performs processing for a control layer of an operating system such as event distribution by touching each content.

The output control unit 23 controls outputs of various types of information from the output unit 14 on the basis of the execution result of the processing by the execution unit 22. For example, the output control unit 23 controls display of a graphical user interface (GUI) and various graphics. Furthermore, for example, the output control unit 23 controls drawing of windows, multi-contents, and the like.

The output unit 14 includes various output devices capable of outputting visual information such as images and auditory information such as audio. For example, the output unit 14 includes a touch panel display, a liquid crystal display, an organic EL display, a projector, a head-mounted display, a speaker, and the like. Note that either wired communication or wireless communication may be used for transferring data between the information processing unit 13 and the output unit 14.

Specific Example of Information Processing System
1 and Object to be Operated Next, a specific example of the information processing system 1 and the object to be operated will be described with reference to FIGS. 2 to 4.

Figure 2:
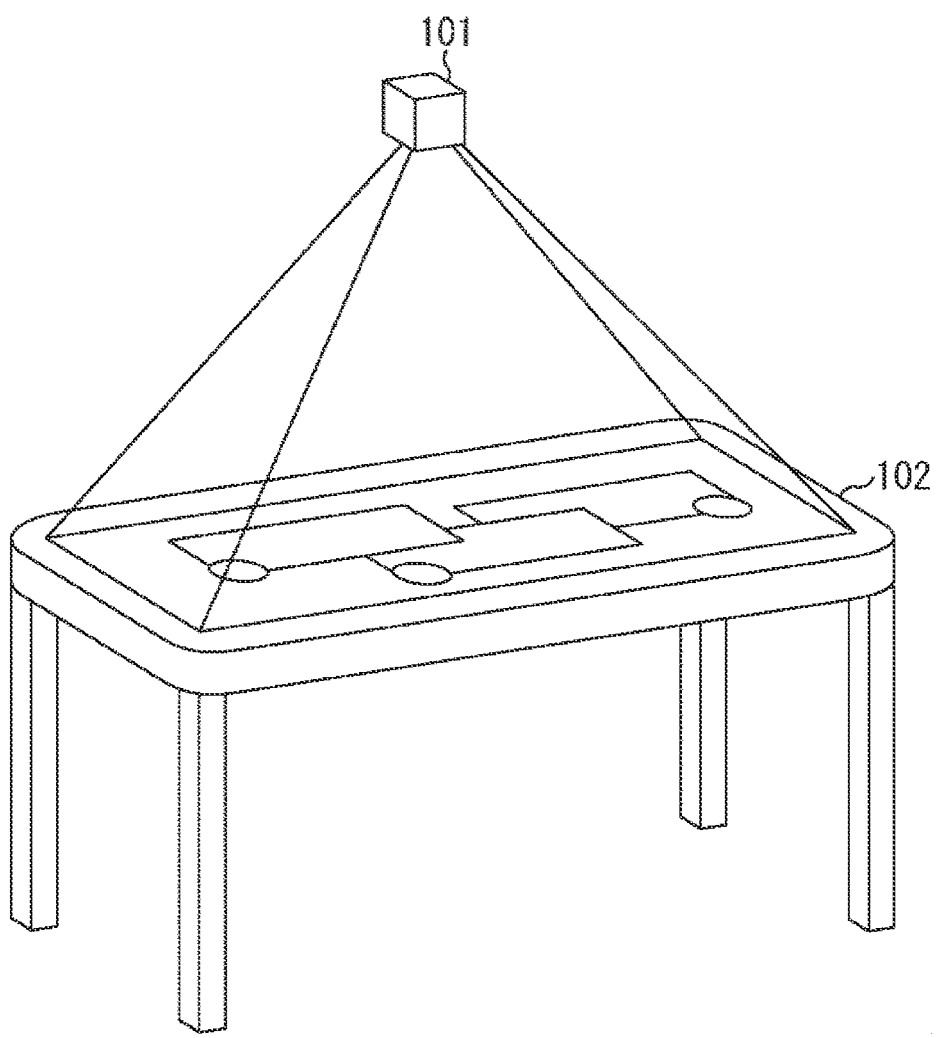
FIG. 2 is a diagram illustrating a specific example of an information processing system and an object to be operated.

FIG. 2 illustrates an example in which a projector with sensor 101 is installed above a desk 102 that is an object to be operated. The projector with sensor 101 corresponds to the detection unit 12 and the output unit 14 of the information processing system 1 in FIG. 1.

The projector with sensor 101 projects an image on a top plate of the desk 102 from above. Further, the projector with sensor 101 captures a periphery of the top plate of the desk 102 by an attached depth sensor, and supplies obtained three-dimensional image data to the information processing unit 13. For example, a display area of an image of the top plate of the desk 102 is set as the operation area, and the depth sensor captures a state where a user operates the operation area.

Figure 3:
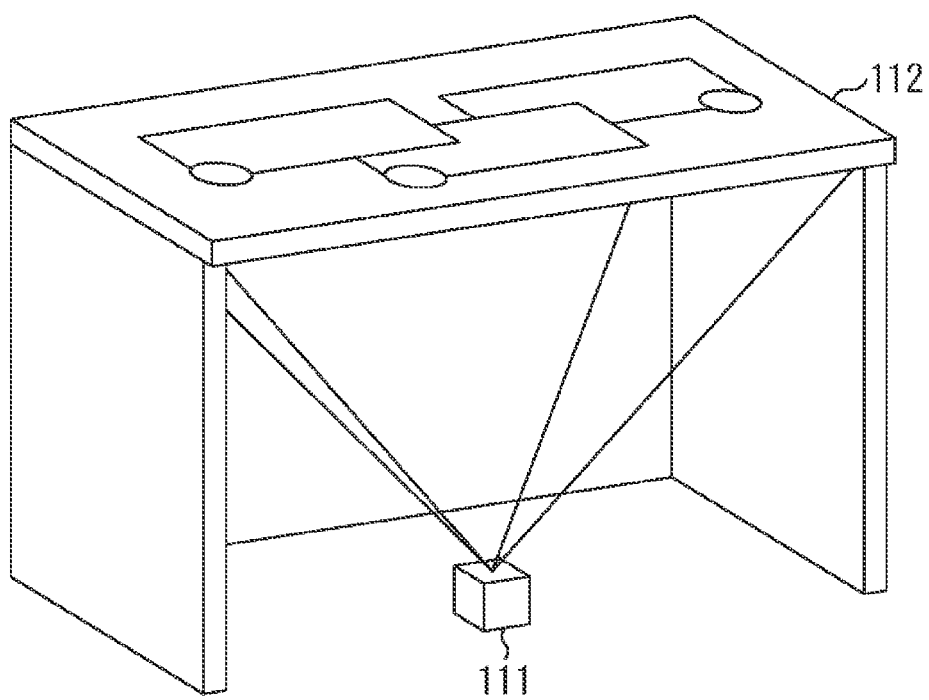
FIG. 3 is a diagram illustrating a specific example of an information processing system and an object to be operated.

FIG. 3 illustrates an example in which a projector with sensor 111 is installed below a desk 112 that is an object to be operated. The projector with sensor 111 corresponds to the detection unit 12 and the output unit 14 of the information processing system 1 in FIG. 1.

The top plate of the desk 112 is a translucent screen, and the projector with sensor 111 projects an image on the top plate of the desk 112 from below. Further, the projector with sensor 111 captures a periphery of the top plate of the desk 112 by an attached depth sensor, and supplies obtained three-dimensional image data to the information processing unit 13. For example, a display area of an image of the top plate of the desk 112 is set as the operation area, and the depth sensor captures a state where a user operates the operation area.

Figure 4:
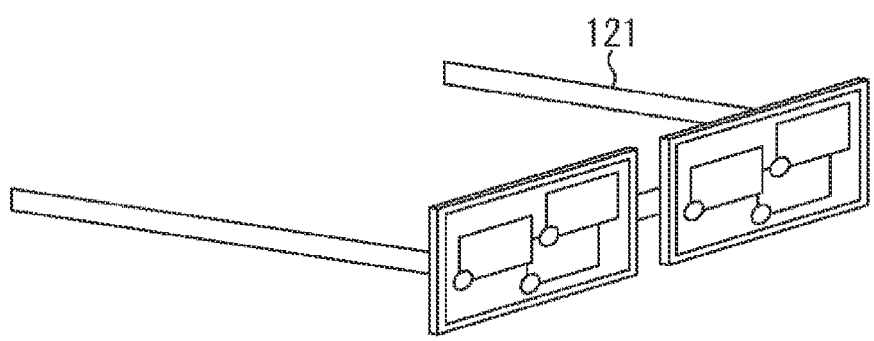
FIG. 4 is a diagram illustrating a specific example of the information processing system and the object to be operated.

FIG. 4 illustrates an example of an eyewear-type wearable terminal 121 constituting the information processing system 1. The wearable terminal 121 superimposes and displays various kinds of visual information in a user's field of view in a state of being worn on the head of the user. Furthermore, the wearable terminal 121 has a built-in depth sensor, for example, and captures a direction of a user's line-of-sight to acquire three-dimensional image data. For example, a surface of an object in the direction of the user's line-of-sight is set as the operation area, and the depth sensor captures a state in which the user operates the operation area.

<Information Processing>

Next, information processing executed by the information processing system 1 will be described with reference to the flowchart in FIG. 5.

This processing is started when the information processing unit 13 is powered on and is terminated when the information processing unit 13 is powered off, for example.

In step S1, the information processing system 1 starts acquisition of the detection data. Specifically, each sensor of the detection unit 12 starts detection processing and supply of the detection data obtained by the detection processing to the information processing unit 13.

In step S2, the operation area setting unit 31 performs operation area setting processing. Details of the operation area setting processing will be described below with reference to FIG. 6, but this processing sets the operation area and sets the operation data type for the operation area.

In step S3, the characteristic detection unit 32 selects one unprocessed operation area. Specifically, the characteristic detection unit 32 selects one operation area to be processed from operation areas for which characteristic detection processing and operation pattern setting processing have not been performed.

In step S4, the characteristic detection unit 32 performs the characteristic detection processing. Details of the characteristic detection processing will be described below with reference to FIG. 9, but this processing detects the characteristic of the operation area selected in the processing in step S3.

In step S5, the operation pattern control unit 33 performs the operation pattern setting processing. Details of the operation pattern setting processing will be described below with reference to FIG. 15, but this processing sets the operation pattern of the operation area selected in the processing in step S3.

In step S6, the characteristic detection unit 32 determines whether or not the processing for all the operation areas has been completed. In a case where there is still an operation area for which the characteristic detection processing and the operation pattern setting processing have not been performed yet, the characteristic detection unit 32 determines that the processing for all the operation areas has not been completed and the processing returns to step S3.

Thereafter, the processing in steps S3 to S6 is repeatedly executed until the processing for all the operation areas is determined to have been completed in step S6. As a result, the characteristic of each operation area is detected, and the operation pattern of each operation area is set.

On the other hand, in a case where the processing for all the operation areas is determined to have been completed in step S6, the processing proceeds to step S7.

In step S7, the operation detection unit 34 determines whether or not a user operation has been performed. This processing is repeatedly executed until the user operation is determined to have been performed. Then, for example, in a case of detecting the user operation corresponding to the applied operation pattern in at least one of the operation areas on the basis of the state of the operation area and the state of the operation object detected on the basis of the detection data, the operation detection unit 34 determines that the user operation has been performed and the processing proceeds to step S8.

In step S8, the information processing system 1 performs processing corresponding to the user operation. Specifically, the operation detection unit 34 detects the operation data input by the user operation on the basis of the detection data and the operation pattern applied to the operation area where the user operation has been performed. The operation detection unit 34 supplies the detected operation data to the execution unit 22.

The execution unit 22 executes predetermined processing on the basis of the detection data and the operation data. The execution unit 22 supplies data indicating an execution result of the processing to the operation control unit 21 and the output control unit 23.

The output unit 14 outputs various types of information indicating the execution result of the processing under the control of the output control unit 23.

Thereafter, the processing proceeds to step S9.

In step S9, the operation area setting unit 31 determines whether or not to change the operation area on the basis of the processing result of the execution unit 22. In a case where it is determined not to change the operation area, the processing returns to step S7.

Thereafter, the processing in steps S7 to S9 is repeatedly executed until it is determined to change the operation area in step S9.

Meanwhile, in step S9, in a case where the user operation for giving an instruction on the change of the operation area is performed, the operation area setting unit 31 determines to change the operation area and the processing returns to step S2.

Thereafter, the processing in and after step S2 is executed. That is, the operation area is reset, and the processing is continued in the reset operation area.

<Operation Area Setting Processing>

Next, details of the operation area setting processing in step S2 in FIG. 5 will be described with reference to the flowchart in FIG. 6.

In step S51, the operation area setting unit 31 sets the operation area. For example, the operation area setting unit 31 searches for a place where each operation area defined in an operation area definition table in FIG. 7 can be set in the image including candidate objects for the object to be operated obtained by the detection unit 12.

The operation area definition table is a table that defines the operation area. The operation area definition table is input via the input unit 11 or is stored in the information processing unit 13 in advance in the form of a relational database, a lookup table, or the like, for example. The operation area definition table includes items of operation area information and the operation data types.

The operation area information includes, for example, information regarding each operation area, for example, the size, shape, setting condition, and the like of each operation area. The setting condition includes, for example, information such as an object and a place where the operation area can be set.

The operation data type indicates the operation data type of the operation data input in each operation area. Examples of the operation data type include binary type, continuous value type, directional type, vector type, and the like.

The binary type is a type that represents the operation data by a binary value such as true or false, or on or off.

The continuous value type is, for example, a type that represents the operation data with continuous values such as integers and decimals within a predetermined range.

The directional type is, for example, a type that represents the operation data in a direction such as up, down, left, or right.

The vector type is, for example, a type that represents the operation data by a vector. That is, the vector type is a type that represents the operation data by a direction and continuous values indicating the magnitude in the direction. Therefore, the vector type is an operation data type that combines the continuous value type and the directional type.

Figure 8:
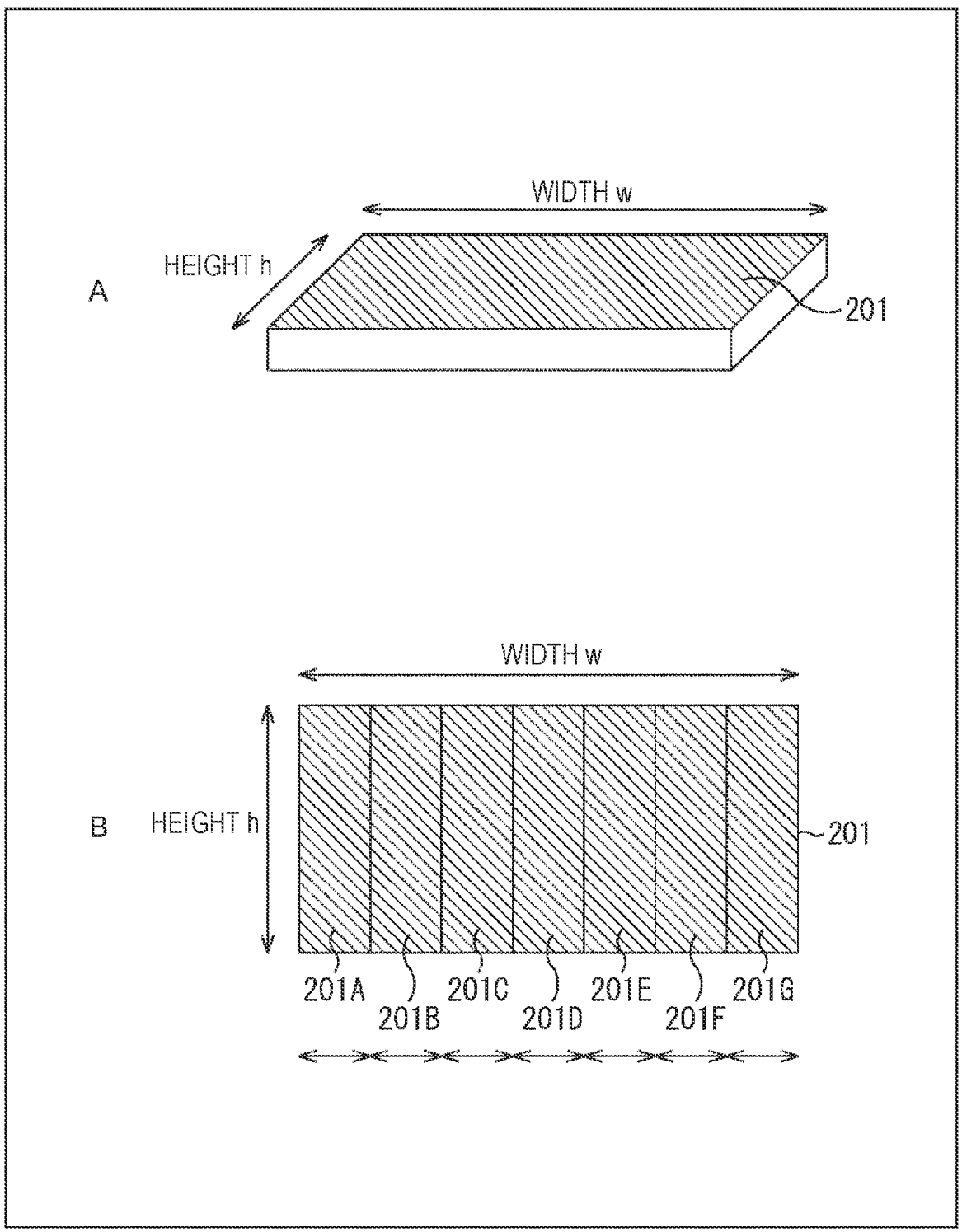
FIG. 8 is diagrams illustrating an example of an operation area.

For example, as illustrated in A in FIG. 8, in a case where a rectangular operation area 201 of a height h×a width w is defined, the operation area setting unit 31 detects a plane having the height h×the width w or larger in the image supplied from the detection unit 12 by template matching or the like. Then, the operation area setting unit 31 sets the operation area 201 in the detected plane.

Note that, for example, as illustrated in B in FIG. 8, in a case where the operation area 201 is further divided into a plurality of operation areas 201A to 201G, the operation area setting unit 31 may set the operations area 201 as one operation area or may individually set each of the operation areas 201A to 201G as one operation area.

For example, in a case where a plurality of buttons is included in an operation screen, the operation area setting unit 31 may set the operation screen as one operation area or may set each button in the operation screen as an individual operation area. Note that, hereinafter, the latter case will be described.

Furthermore, for example, in a case where the output unit 14 displays the operation screen or the like on the object to be operated and performs the user operation, the operation area may be set in a state where the operation screen or the like is displayed, or the operation area may be set in a state where the operation screen is not displayed.

In the former case, for example, the operation area is set on the basis of the actually displayed operation screen or the like. For example, the operation area is set on the basis of the position of each button or the like in the operation screen. In the latter case, for example, the operation area is set on the basis of the operation information definition table, and the operation screen or the like is displayed according to the set operation area. For example, the individual buttons and the like in the operation screen are displayed according to the position of the set operation areas.

In step S52, the operation area setting unit 31 selects one unprocessed operation area. That is, the operation area setting unit 31 selects one operation area for which the operation data type is to be set next from among the operation areas for which the operation data type has not been set yet.

In step S53, the operation area setting unit 31 sets the operation data type. Specifically, the operation area setting unit 31 sets the operation data type associated with the selected operation area in the operation area definition table as a selection data type of the operation area.

In step S54, the operation area setting unit 31 determines whether or not the processing for all the operation areas has been completed. In a case where there is still an operation area for which the operation data type has not been set yet, the operation area setting unit 31 determines that the processing for all the operation areas has not been completed and the processing returns to step S52.

Thereafter, the processing in steps S52 to S54 is repeatedly executed until the processing for all the operation areas is determined to have been completed in step S54. Thereby, the operation data type of each operation area is set.

On the other hand, in a case where the processing for all the operation areas is determined to have been completed in step S54, the processing proceeds to step S55.

In step S55, the operation area setting unit 31 outputs setting information of the operation area. For example, the operation area setting unit 31 supplies setting information including the position where each operation area is set and the operation data type of each operation area to the characteristic detection unit 32.

<Characteristic Detection Processing>

Figure 9:
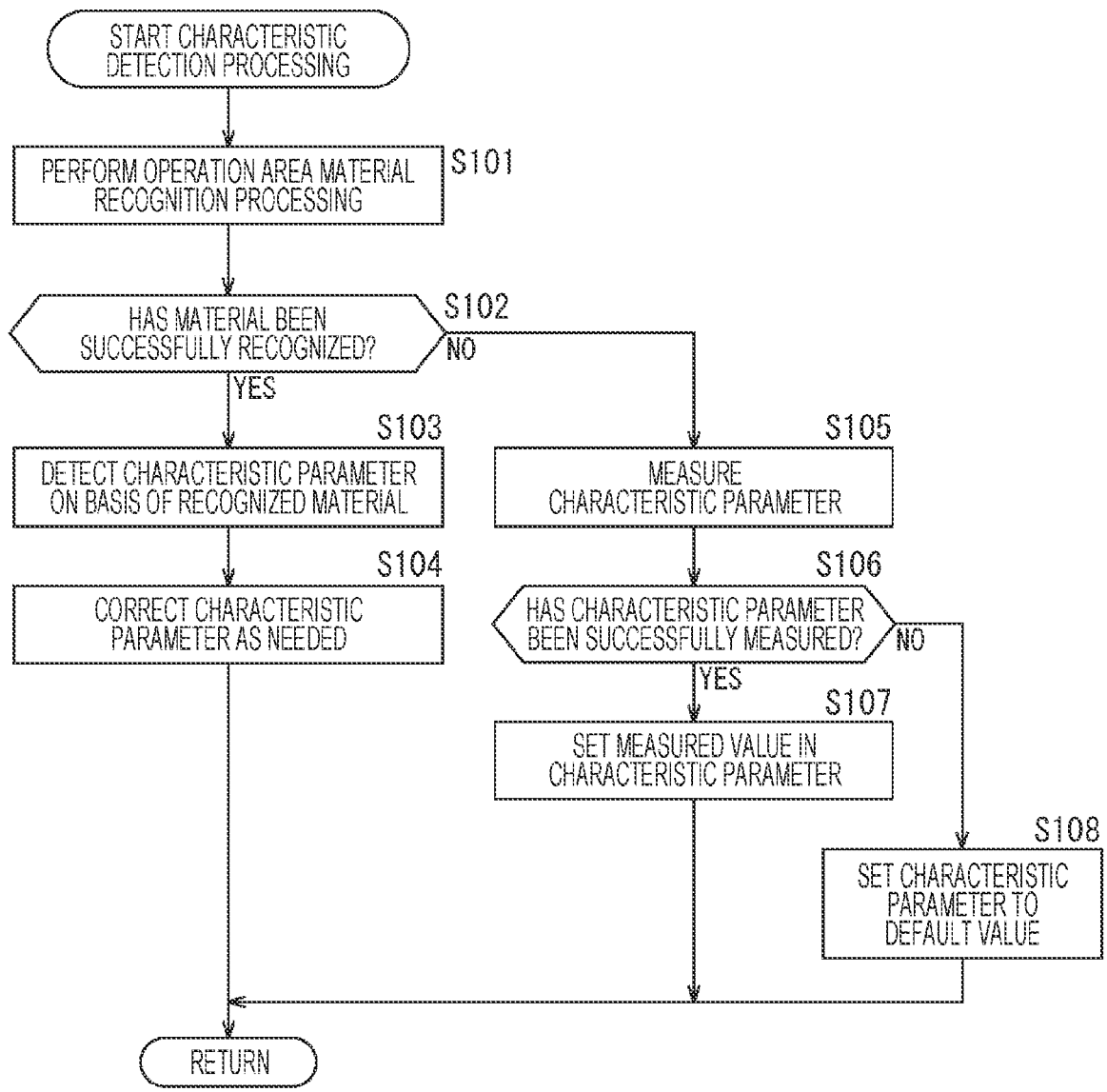
FIG. 9 is a flowchart for describing details of a characteristic detection processing.

Next, details of the characteristic detection processing in step S4 in FIG. 5 will be described with reference to the flowchart in FIG. 9.

In step S101, the characteristic detection unit 32 performs operation area material recognition processing on the basis of the detection data. For example, the characteristic detection unit 32 performs material recognition processing for the object to be operated that constitutes the operation area on the basis of the image of the operation area in image data included in the detection data. For example, the characteristic detection unit 32 recognizes a material corresponding to the material of the object to be operated that constitutes the operation area from materials defined in a material definition table illustrated in FIG. 10.

The material definition table is a table that defines the materials that can be applied to (the object to be operated constituting) the operation area. The material definition table is input via the input unit 11 or is stored in the information processing unit 13 in advance in the form of a relational database, a lookup table, or the like, for example. The material definition table includes items of material names and characteristic parameters.

The characteristic parameter is a parameter indicating a characteristic of each material. For example, the characteristic parameter includes parameters indicating a property and a state of each material. In this example, frictional force, elasticity, and brittleness are included as the parameters indicating the properties of each material. The frictional force is represented by, for example, a friction coefficient. The elasticity is represented by, for example, an elastic coefficient (elastic modulus) and an elastic limit. For example, the elasticity becomes larger as the elastic coefficient becomes smaller or the elastic limit becomes larger, and becomes smaller as the elastic coefficient becomes larger or the elastic limit becomes smaller. Therefore, the elasticity of the material that is easily deformed (soft) and easily returns to the original shape is large, and the elasticity of the material that does not easily deform (hard) or return to the original shape is small. Furthermore, dirtiness and temperature are included as the parameters indicating the states of each material.

Note that not all the characteristic parameters need to be defined in advance. Undefined characteristic parameters are set, for example, by measurement or by user input.

In step S102, the characteristic detection unit 32 determines whether or not the material has been successfully recognized. In a case where it is determined that the material has been successfully recognized, the processing proceeds to step S103.

In step S103, the characteristic detection unit 32 detects the characteristic parameters on the basis of the recognized material. Specifically, the characteristic detection unit 32 extracts the characteristic parameters corresponding to the recognized material from the material definition table and sets the extracted the characteristic parameters as the characteristic parameters of the operation area.

In step S104, the characteristic detection unit 32 corrects the characteristic parameters as necessary.

For example, the characteristic detection unit 32 measures a characteristic parameter not defined in the material definition table on the basis of the detection data, and sets the measured characteristic parameter for the operation area.

For example, the characteristic detection unit 32 instructs the execution unit 22 to execute characteristic parameter measurement processing. The execution unit 22 controls the output control unit 23 to cause the output unit 14 to output an image indicating an operation instruction to the user.

In response, the user performs the operation on which an instruction is given, and the detection unit 12 acquires the detection data at the time of operation by the user and supplies the detection data to the information processing unit 13. The characteristic detection unit 32 measures the characteristic parameters of the operation area on the basis of the detection data supplied from the detection unit 12.

FIG. 11 illustrates an example of a characteristic measurement definition table illustrating a method of measuring each characteristic parameter. The characteristic measurement definition table is input via the input unit 11 or is stored in the information processing unit 13 in advance in the form of a relational database, a lookup table, or the like. The characteristic measurement definition table includes items of characteristic parameter names and measurement methods.

For example, the frictional force is estimated on the basis of a velocity of the user's finger rubbing a surface of an object and a vibration of the fingertip.

Figure 12:
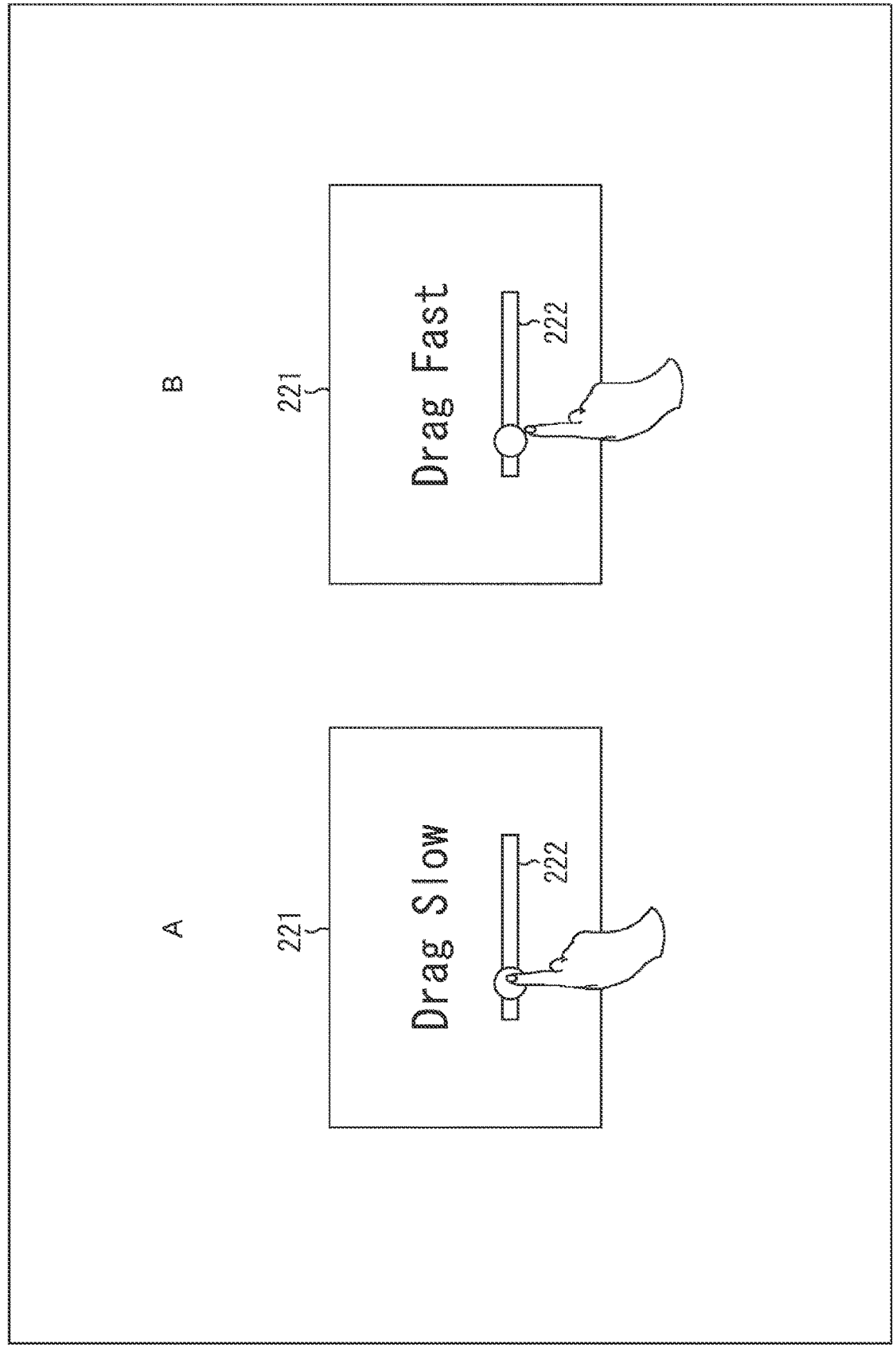
FIG. 12 is diagrams illustrating an example of methods of measuring a frictional force.

For example, as illustrated in A and B in FIG. 12, the output unit 14 displays a slider 222 on the surface of an operation area 221 where the frictional force is unknown. Furthermore, in A in FIG. 12, an instruction to slowly drag the slider 222 is given, and in B in FIG. 12, an instruction to quickly drag the slider 222 is given. The user drags the slider 222 with his/her finger at the velocity on which the instruction is given.

Then, the characteristic detection unit 32 detects the velocity of the user's finger and the vibration of the fingertip on the basis of image data of when the user drags the slider 222, for example. Moreover, the characteristic detection unit 32 estimates the friction coefficient of the operation area 221 on the basis of the velocity of the user's finger and the vibration of the fingertip.

For example, the elasticity is estimated on the basis of the position of the user's finger pushing the surface of the object and deformation of the object.

Figure 13:
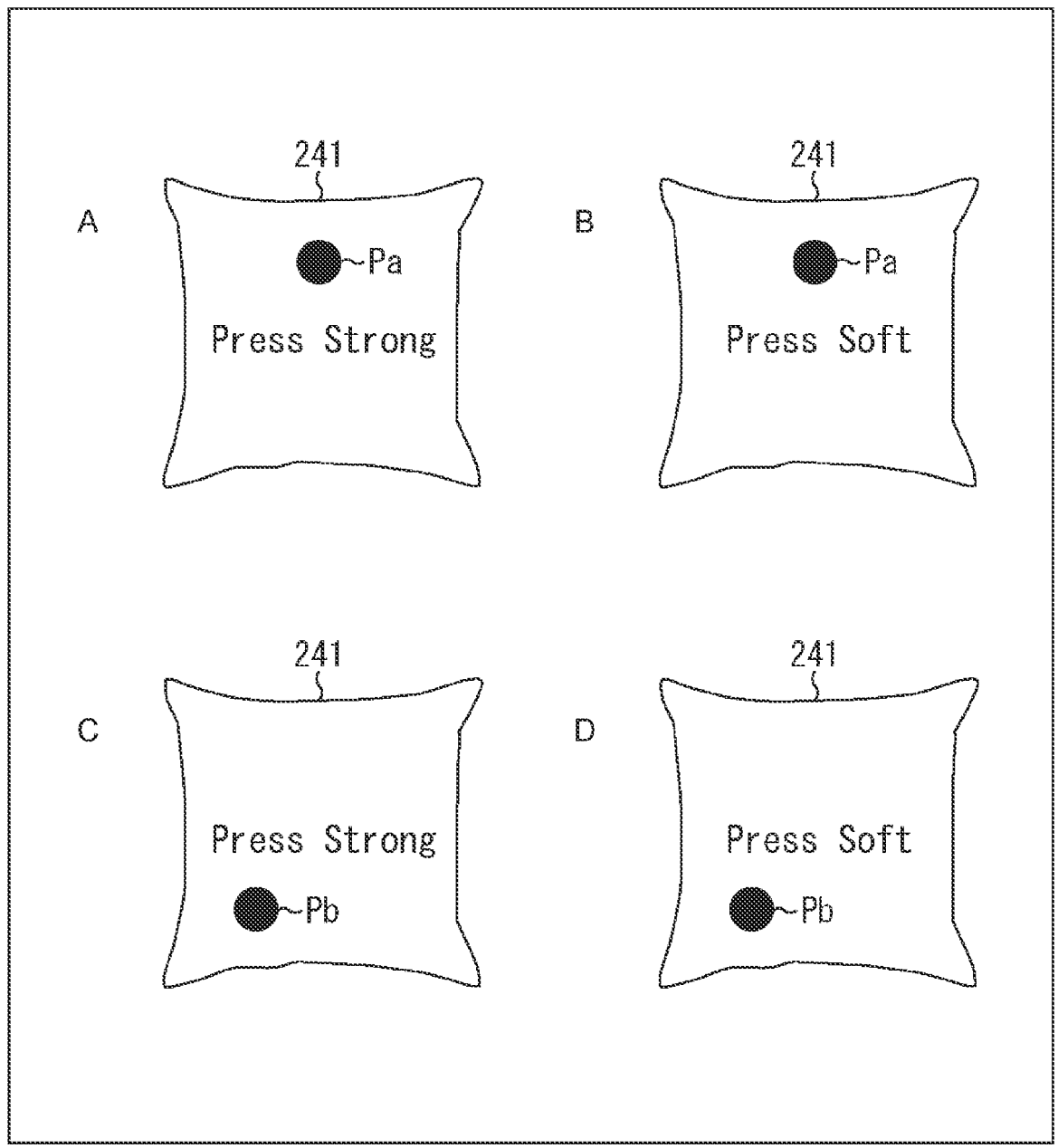
FIG. 13 is diagrams illustrating examples of a method of measuring an elasticity.

For example, as illustrated in A and B in FIG. 13, the output unit 14 displays a pointer Pa or a pointer Pb on the surface of a cushion 241 that is an object to be operated with unknown elasticity. Then, in A in FIG. 13, an instruction to strongly press the pointer Pa is given, in B in FIG. 13, an instruction to weakly press the pointer Pa is given, in C in FIG. 13, an instruction to strongly press the pointer Pb is given, and in B in FIG. 13, an instruction to weakly press the pointer Pb is given. The user presses the position indicated by the pointer Pa or the pointer Pb with the strength on which the instruction is given.

Meanwhile, the detection unit 12 includes, for example, a bending sensor, a pressure sensor, and a depth sensor provided in the cushion 241. Then, the characteristic detection unit 32 detects the position of the user's finger and the amount of deformation of the cushion 241 of when the surface of the cushion 241 is pushed, and the amount of deformation of the cushion 241 after the cushion 241 is pushed (after the finger is released) on the basis of the detection data of each sensor. The characteristic detection unit 32 estimates the elasticity (for example, the elastic coefficient and the elastic limit) of the cushion 241 on the basis of the detected position of the user's finger and the detected amount of deformation of the cushion 241. Then, the characteristic detection unit 32 sets the estimated elasticity of the cushion 241 as the elasticity of the operation area. Note that not all the bending sensor, the pressure sensor, and the depth sensor need to be provided and can be reduced within a detectable range of the position of the user's finger and the amount of deformation of the cushion 241.

Figure 14:
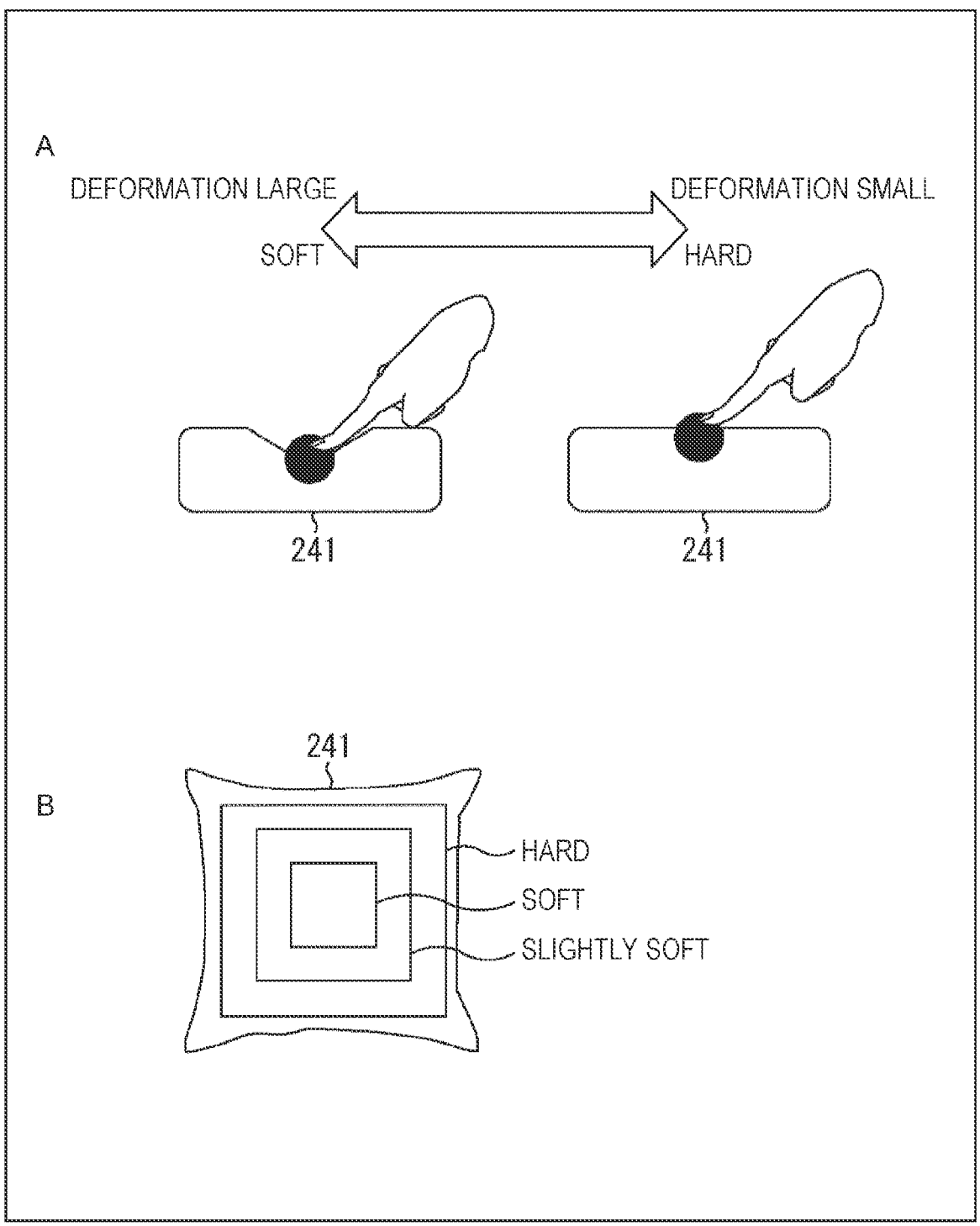
FIG. 14 is diagrams illustrating examples of the method of measuring an elasticity.

At this time, as illustrated in A in FIG. 14, the deformation of the surface becomes larger as the surface of the cushion 241 is softer, and the deformation of the surface becomes smaller as the surface of the cushion 241 is harder. Therefore, the detection unit 12 may set the elasticity of the cushion 241 separately for each area on the basis of the amount of deformation of the cushion 241. For example, as illustrated in B in FIG. 14, the surface of the cushion 241 is softer toward a center and harder toward edges. Therefore, the characteristic detection unit 32 divides the surface of the cushion 241 into three areas and sets the elasticity for each area. Thereby, the elasticity of the operation area on the surface of the cushion 241 is more accurately set.

For example, the brittleness is estimated on the basis of a state of touch with the user's hand. For example, in a case where the operation area is damaged or deformed when the user touches the operation area with the user's hand with a similar force to the time of operation, the operation area is determined to be brittle, and in a case where no damage or deformation occurs, the operation area is determined not to be brittle.

For example, the dirtiness is estimated on the basis of image recognition. For example, in a case where an adhesive material is recognized in the operation area by image recognition, whether or not the adhesive material gets the hand dirty is determined on the basis of a database prepared in advance. Then, in a case where the adhesive material that gets the hand dirty is attached to the operation area, the operation area is determined to be dirty, and in a case where the adhesive material that gets the hand dirty is not attached to the operation area, the operation area is determined not to be dirty.

For example, the temperature is measured by a thermography or a temperature sensor. For example, the temperature of the operation area is measured by the thermography provided in the detection unit 12. Alternatively, for example, the temperature of the operation area is measured by the temperature sensor provided in or around the operation area of the object to be operated. Alternatively, for example, in an image obtained by capturing the operation area, the temperature of the operation area is estimated from the color of the operation area or the like.

Furthermore, for example, the characteristic detection unit 32 sets a characteristic parameter not registered in the material definition table or corrects a value of the characteristic parameter registered in the material definition table on the basis of data input by the user via the input unit 11.

Then, the characteristic detection unit 32 supplies information indicating the characteristic parameters of the operation area to the operation pattern control unit 33.

Thereafter, the characteristic detection processing ends.

Meanwhile, in step S102, in a case where the material of the operation area cannot be recognized or in a case where the recognized material of the operation area is not defined in the material definition table on the basis of the detection data, for example, recognition of the material is determined to be failed, and the processing proceeds to step S105.

In step S105, the characteristic parameters are measured by processing similar to the processing in step S104.

In step S106, whether or not the characteristic parameters have been successfully measured is determined. In a case where it is determined that the characteristic parameters have been successfully measured, the processing proceeds to step S107.

In step S107, the characteristic detection unit 32 sets a measured value in the characteristic parameter. That is, the characteristic detection unit 32 sets the measured value measured in the processing in step S106 in each characteristic parameter of the operation area. The characteristic detection unit 32 supplies information indicating the characteristic parameters of the operation area to the operation pattern control unit 33.

Thereafter, the characteristic detection processing ends.

On the other hand, in a case where measurement of the characteristic parameters is determined to be failed in step S106, the processing proceeds to step S108. This is assumed, for example, when the detection data necessary for measuring the characteristic parameters could not be acquired.

In step S108, the characteristic detection unit 32 sets the characteristic parameters to default values. That is, the characteristic detection unit 32 sets each characteristic parameter of the operation area to a preset default value. Note that, in a case where some of the characteristic parameters have been successfully measured, the measured values may be used for the characteristic parameters. Furthermore, for example, the user may set some or all of the characteristic parameters. The characteristic detection unit 32 supplies the information indicating the characteristic parameters of the operation area to the operation pattern control unit 33.

Thereafter, the characteristic detection processing ends.

<Operation Pattern Setting Processing>

Figure 15:
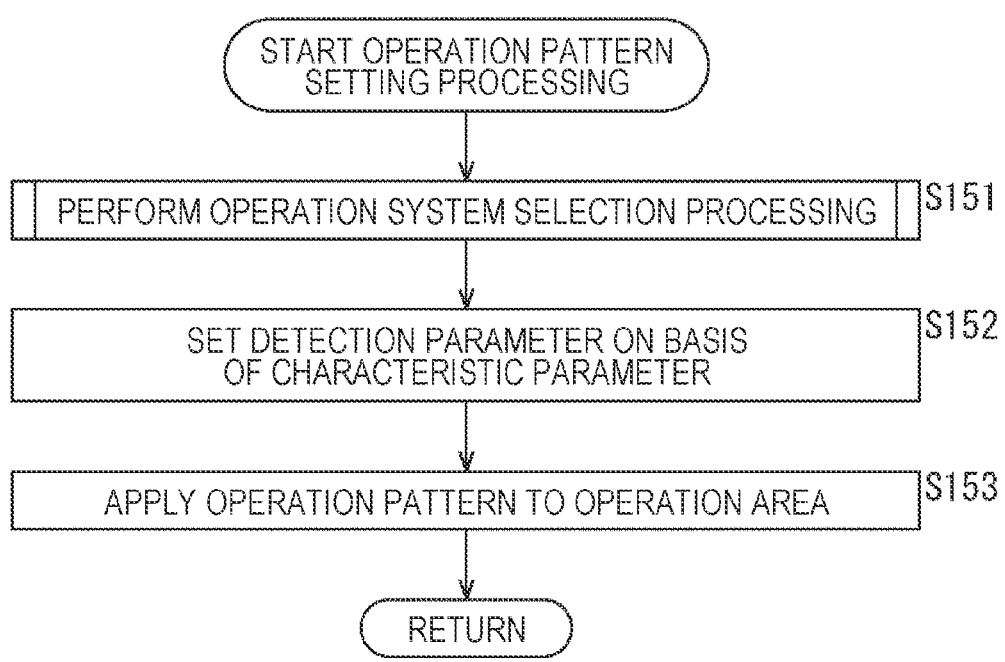
FIG. 15 is a flowchart for describing details of operation pattern setting processing.

Next, details of the operation pattern setting processing in step S5 in FIG. 5 will be described with reference to the flowchart in FIG. 15.

In step S151, the operation pattern control unit 33 performs operation system selection processing.

Figure 16:
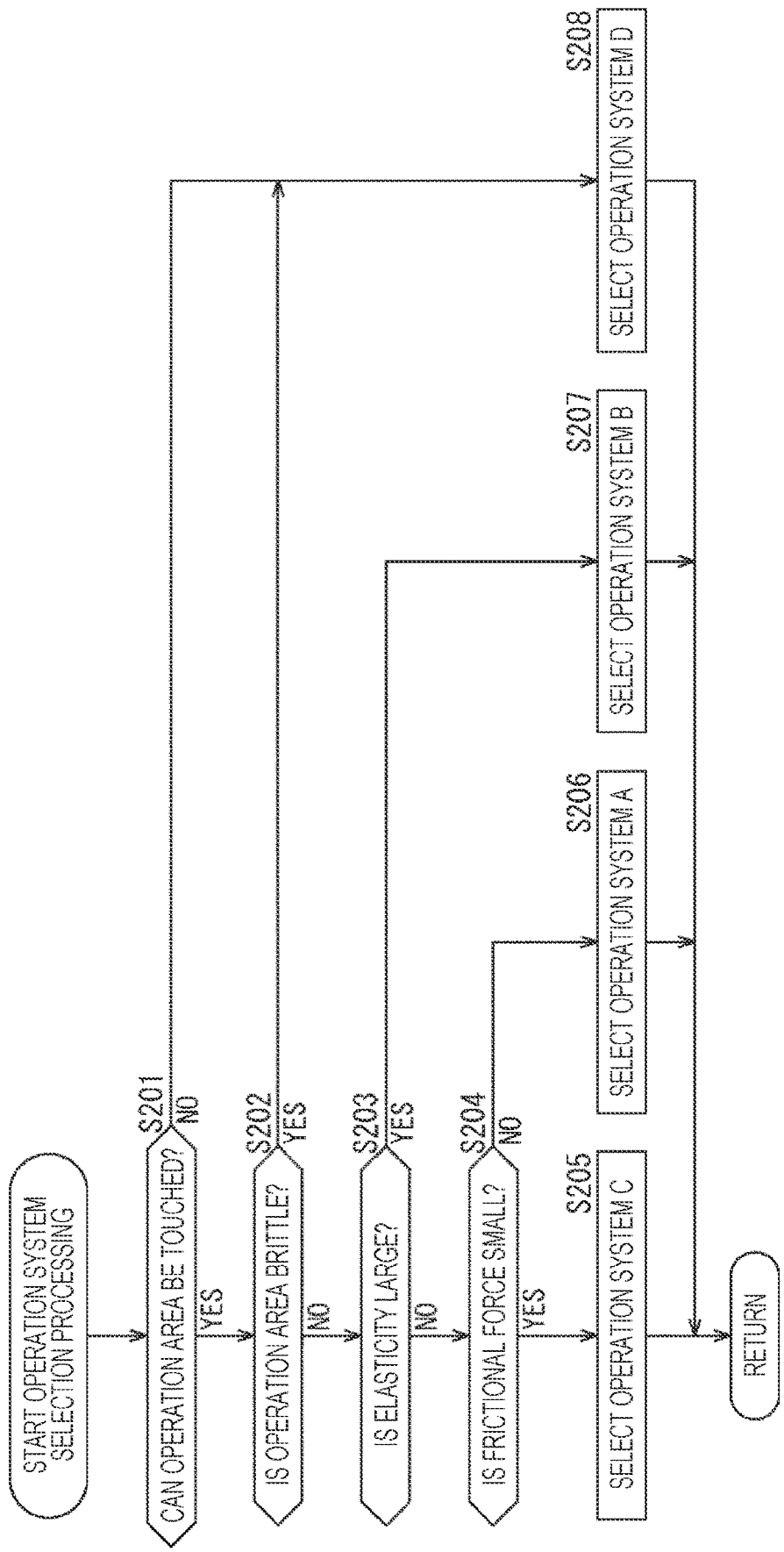
FIG. 16 is a flowchart for describing details of operation system selection processing.
Figure 18:
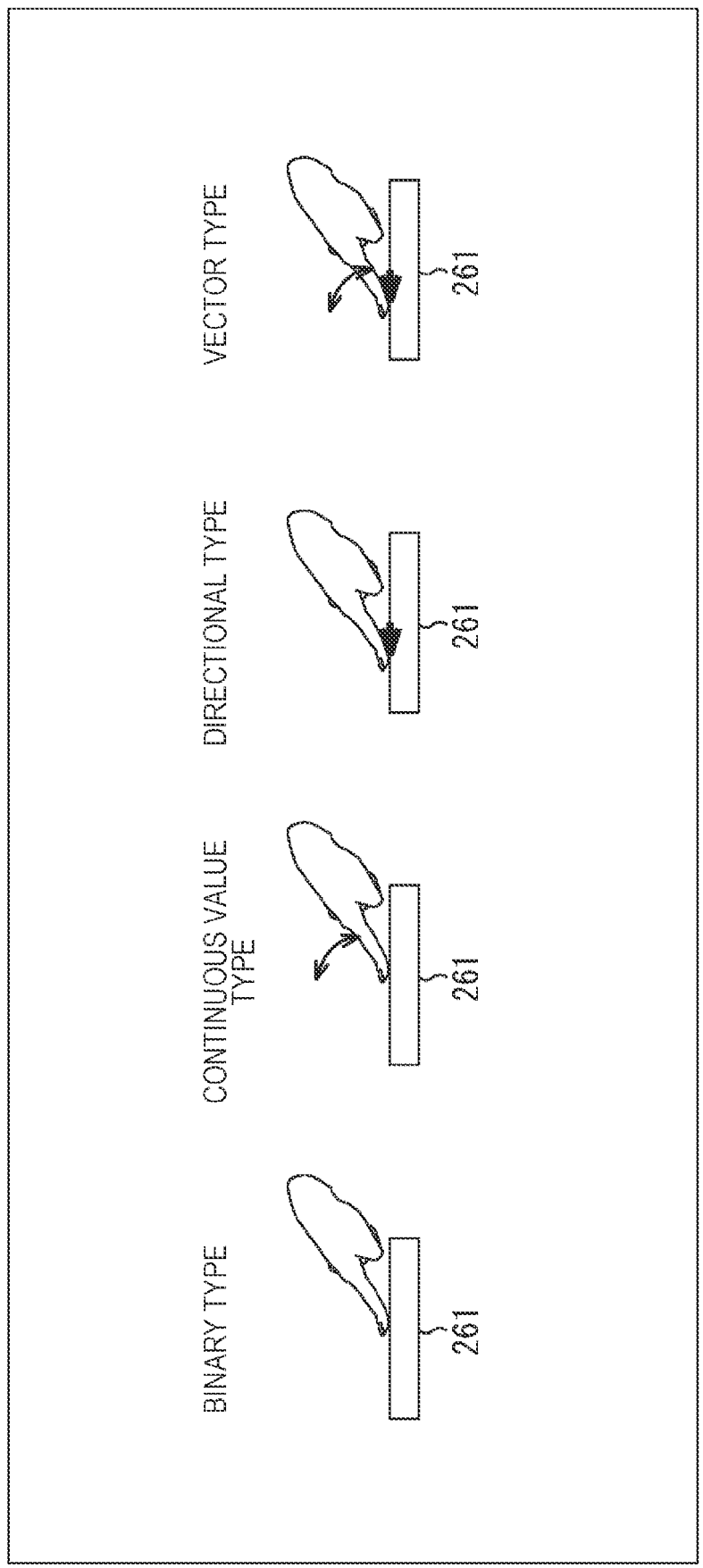
FIG. 18 is a diagram for describing an operation system A.
Figure 19:
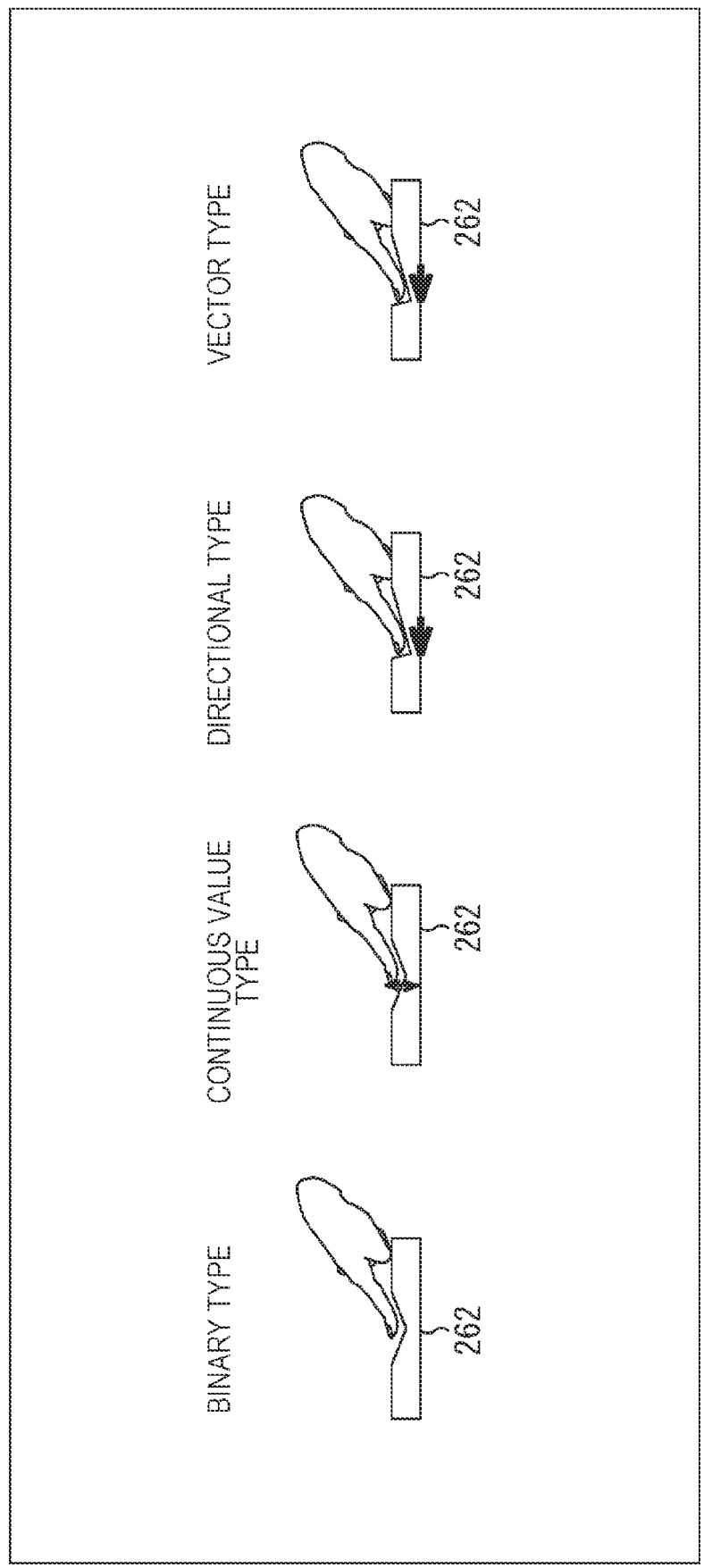
FIG. 19 is a diagram for describing an operation system B.
Figure 20:
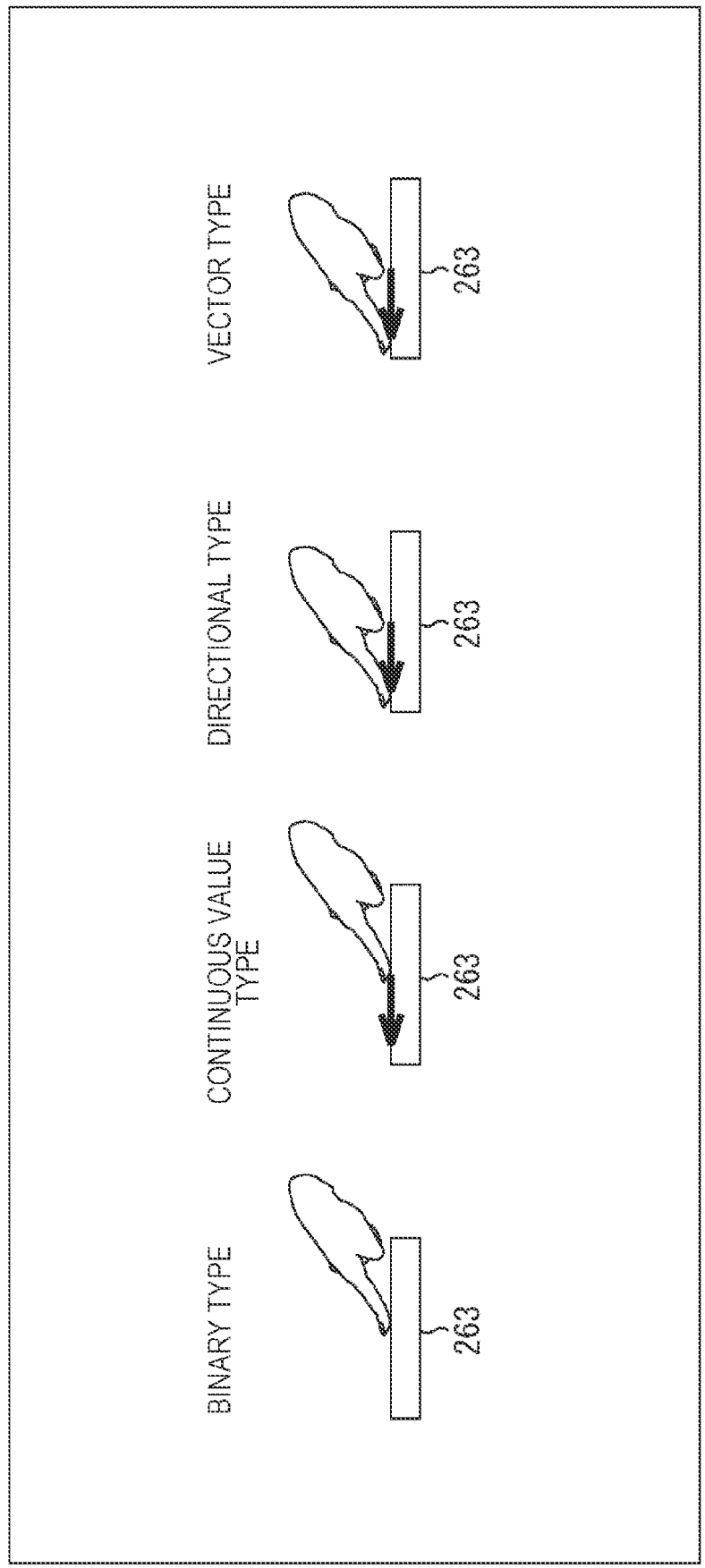
FIG. 20 is a diagram for describing an operation system C.
Figure 21:
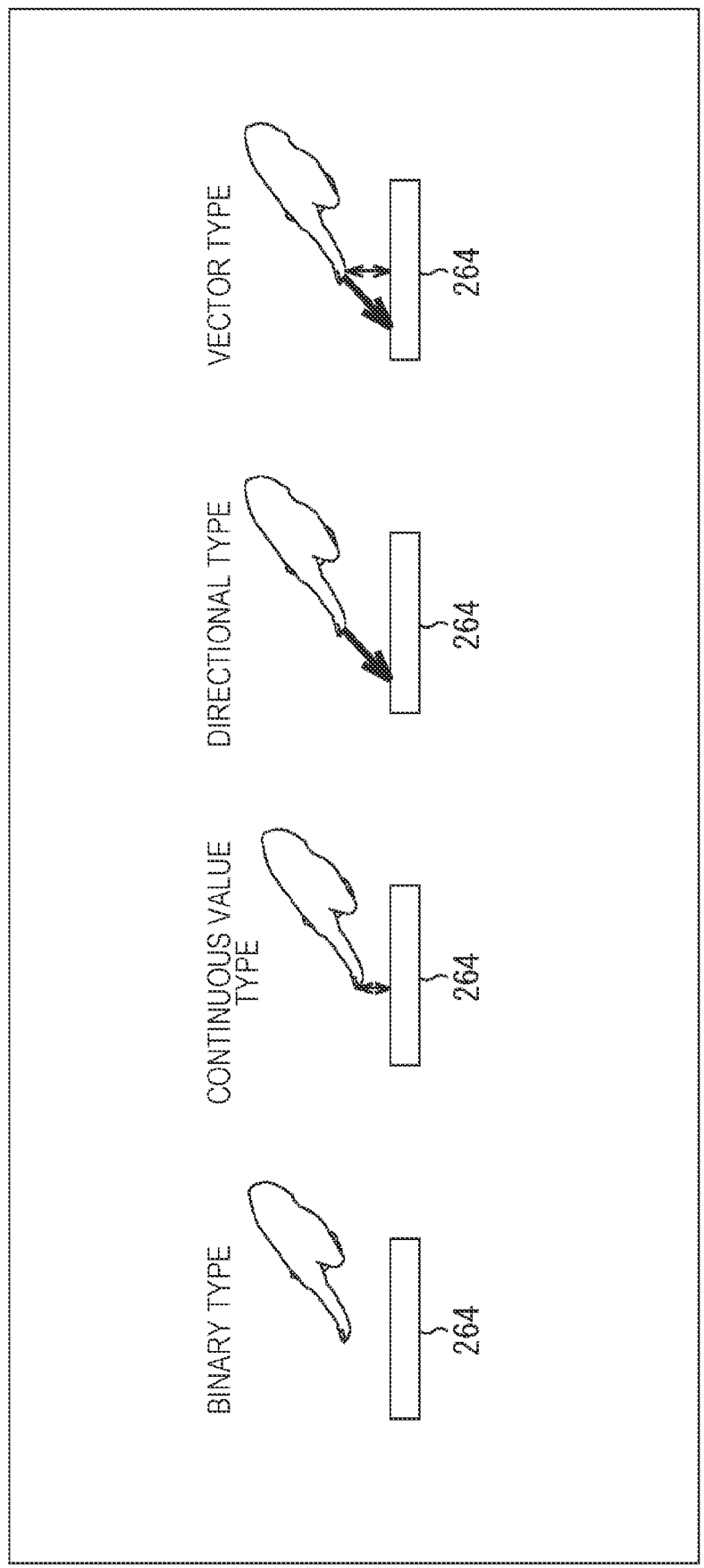
FIG. 21 is a diagram for describing an operation system D.

Here, details of the operation system selection processing will be described with reference to the flowchart in FIG. 16.

In step S201, the operation pattern control unit 33 determines whether or not the operation area can be touched on the basis of the characteristic parameters of the operation area. For example, the operation pattern control unit 33 determines that the operation area can be touched in a case where the operation area is not dirty and the temperature of the operation area is less than a predetermined threshold value, and the processing proceeds to step S202.

Note that the threshold value of the temperature used for this determination processing may be changed according to, for example, the material of the operation area.

In step S202, the operation pattern control unit 33 determines whether or not the operation area is brittle on the basis of the characteristic parameters of the operation area. In a case where the operation area is determined not to be brittle, the processing proceeds to step S203.

In step S203, the operation pattern control unit 33 determines whether or not the elasticity of the operation area is large on the basis of the characteristic parameters of the operation area. For example, in a case where the elastic coefficient of the operation area is equal to or larger than a predetermined threshold value, that is, in a case where the operation area is less easily deformed, or in a case where the elastic limit of the operation area is less than a predetermined threshold value, that is, in a case where the operation area less easily returns to the original shape, the operation pattern control unit 33 determines that the elasticity of the operation area is small, and the processing proceeds to step S204.

In step S204, the operation pattern control unit 33 determines whether or not the frictional force of the operation area is small on the basis of the characteristic parameters of the operation area. For example, in a case where the friction coefficient of the operation area is less than a predetermined threshold value, the operation pattern control unit 33 determines that the frictional force of the operation area is small, and the processing proceeds to step S205.

In step S205, the operation pattern control unit 33 selects an operation system C. Details of the operation system C will be described below.

Thereafter, the operation system selection processing ends.

Meanwhile, in step S204, for example, in a case where the friction coefficient of the operation area is equal to or larger than a predetermined threshold value, the operation pattern control unit 33 determines that the frictional force of the operation area is large, and the processing proceeds to step S206.

In step S206, the operation pattern control unit 33 selects an operation system A. Details of the operation system A will be described below.

Thereafter, the operation system selection processing ends.

Meanwhile, in step S203, for example, in a case where the elastic coefficient of the operation area is less than the predetermined threshold value and the elastic limit of the operation area is equal to or larger than the predetermined threshold value, that is, in a case where the operation area is easily deformed and easily returns to the original shape, the operation pattern control unit 33 determines that the elasticity of the operation area is large, and the processing proceeds to step S207.

In step S207, the operation pattern control unit 33 selects an operation system B. Details of the operation system B will be described below.

Thereafter, the operation system selection processing ends.

On the other hand, in a case where the operation area is determined to be brittle in step S202, the processing proceeds to step S208.

Furthermore, in step S201, for example, the operation pattern control unit 33 determines that the operation area cannot be touched in a case where the operation area is dirty or the temperature of the operation area is equal to or larger than the predetermined threshold value, and the processing proceeds to step S208.

In step S208, the operation pattern control unit 33 selects an operation system D. Details of the operation system D will be described below.

Thereafter, the operation system selection processing ends.

Here, details of the operation systems will be described with reference to FIGS. 17 to 21.

FIG. 17 illustrates an example of the operation system definition table illustrating definition of the operation systems. The operation system definition table is input via the input unit 11 or is stored in the information processing unit 13 in advance in the form of a relational database, a lookup table, or the like, for example. The operation system definition table illustrates the operation patterns in the operation data types of the operation system A to the operation system D. FIGS. 18 to 21 schematically illustrate methods of inputting the operation data of the operation data types in the operation system A to the operation system D.

As described above, the operation system A is selected in the case where the operation area can be touched, the operation area is not brittle, the elasticity of the operation area is small, and the frictional force of the operation area is large. For example, in the case where the operation area is configured by a material having a small elasticity and a large frictional force such as cloth, the operation system A is selected.

In the operation system A, the binary type operation data is input by touching an operation area 261. That is, an operation value (binary value) of the operation data is input according to the presence or absence of touch of the operation area 261. In other words, the operation value of the operation data is detected on the basis of the presence or absence of touch of the operation area 261.

The continuous value type operation data is input by diagonally tilting the finger and touching the operation area 261. That is, the operation value (continuous values) of the operation data is input according to an angle of the finger with respect to a normal direction of the operation area 261 when the operation area 261 is touched. In other words, the operation value of the operation data is detected on the basis of the angle of the finger with respect to the normal direction of the operation area 261 when the operation area 261 is touched.

The directional type operation data is input by pointing the finger in a desired direction and touching the operation area 261. That is, the operation value (direction) of the operation data is input according to an orientation of the finger viewed from above the operation area 261 when the operation area 261 is touched. In other words, the operation value of the operation data is detected on the basis of the orientation of the finger when the operation area 261 is touched.

The vector type operation data is input by pointing the finger in a desired direction, diagonally tilting the finger, and touching the operation area 261 by an operation amount. That is, the operation values (continuous values and direction) of the operation data are input according to the angle of the finger with respect to the normal direction of the operation area 261 when the operation area 261 is touched and the orientation of the finger viewed from above the operation area 261. In other words, the continuous values of the operation data are detected on the basis of the angle of the finger with respect to the normal direction of the operation area 261 when the operation area 261 is touched, and the direction of the operation data is detected on the basis of the orientation of the finger when the operation area 261 is touched.

As described above, the operation system B is selected in the case where the operation area can be touched, the operation area is not brittle, the elasticity of the operation area is large. For example, in the case where the operation area is configured by a material having a large elasticity such as urethane, the operation system B is selected.

In the operation system B, the binary type operation data is input by pushing an operation area 262 in a vertical direction. That is, the operation value (binary value) of the operation data is input according to whether or not a pushing amount (displacement) in a vertical direction of the operation area 262 is equal to or more than a predetermined threshold value. In other words, the operation value of the operation data is detected on the basis of whether or not the pushing amount in the vertical direction of the operation area 262 is equal to or larger than a predetermined threshold value.

The continuous value type operation data is input by pushing the operation area 262 in the vertical direction. That is, the operation value (continuous values) of the operation data is input according to the pushing amount (displacement) in the vertical direction of the operation area 262. In other words, the operation value of the operation data is detected on the basis of the pushing amount in the vertical direction of the operation area 262.

The directional type operation data is input by diagonally pushing the operation area 262. That is, the operation value (direction) of the operation data is input according to the orientation (pushing direction) of the finger viewed from above the operation area 262 when the operation area 262 is pushed in the vertical direction by a predetermined threshold value or more. In other words, the operation value of the operation data is detected on the basis of the orientation of the finger when the operation area 262 is pushed in the vertical direction by a predetermined threshold value or more.

The vector type operation data is input by diagonally pushing the operation area 262. That is, the operation values (direction and continuous value) of the operation data are input according to the pushing amount (displacement) in the vertical direction of the operation area 262 and the orientation (pushing direction) of the finger as viewed from above the operation area 262 of when the operation area 262 is pushed. In other words, the continuous value of the operation data is detected on the basis of the pushing amount (displacement) in the vertical direction of the operation area 262, and the direction of the operation data is detected on the basis of the orientation of the finger as viewed from above the operation area 262 when the operation area 262 is pushed.

As described above, the operation system C is selected in the case where the operation area can be touched, the operation area is not brittle, the elasticity of the operation area is small, and the frictional force of the operation area is small. For example, in the case where the operation area is configured by a material having a small elasticity and a small frictional force such as glass, the operation system C is selected.

In the operation system C, the binary type operation data is input by touching an operation area 263. That is, the operation value (binary value) of the operation data is input according to the presence or absence of touch of the operation area 263. In other words, the operation value of the operation data is detected on the basis of the presence or absence of touch of the operation area 263.

The continuous value type operation data is input by dragging the operation area 263. That is, the operation value (continuous value) of the operation data is input according to the distance in which the operation area 263 is dragged. In other words, the operation value of the operation data is detected on the basis of the distance in which the operation area 263 is dragged. The distance in which the operation area 263 is dragged is represented by, for example, a distance (moving distance) from a position where the operation area 263 is touched to a position where the finger is stopped or the finger is released from the operation area 263.

The directional type operation data is input by swiping the operation area 263. The swipe is an operation of moving a finger while keeping the finger touching the operation area in a desired direction for a predetermined distance or more after touching the operation area. That is, the operation value (continuous value) of the operation data is input according to the direction in which the operation area 263 is swiped. In other words, the operation value of the operation data is detected on the basis of the direction in which the operation area 263 is swiped. The direction in which the operation area 263 is swiped is represented by, for example, the moving direction of the finger with reference to the position where the operation area 263 is touched.

The vector type operation data is input by dragging the operation area 263. That is, the operation values (continuous value and direction) of the operation data are input according to the distance and direction in which the operation area 263 is dragged. In other words, the continuous values of the operation data is detected on the basis of the distance in which the operation area 263 is dragged, and the direction of the operation data is detected on the basis of the direction in which the operation area 263 is dragged. The direction in which the operation area 263 is dragged is represented by, for example, the moving direction of the finger with reference to the position where the operation area 263 is touched.

Note that the operation system A to the operation system C are selected on the basis of at least one of the elasticity or the frictional force of the operation area, as described with reference to FIG. 16. Then, by selecting one of the operation system A to the operation system C, the method of inputting the continuous values and the direction represented by the operation data is set.

For example, the method of inputting the continuous values on the basis of which one of the inclination of the finger (operation object) with respect to the operation area (operation system A), the pushing amount of the operation area (operation system B), or the moving distance of the finger (operation object) on the operation area (operation system C) is selected.

Furthermore, for example, the method of inputting the direction on the basis of which one of the orientation of the finger when the operation area is touched (when the operation object touches the operation area) (operation system A), the orientation of the finger when the operation area is pushed by the finger (operation object) (operation system B), or the moving direction of the finger (operation object) on the operation area (operation system C) is selected.

Note that the case where the operation data is represented by continuous values is the case where the operation data is the continuous value type or the vector type. Furthermore, the case where the operation data is represented by the direction is the case where the operation data is the directional type or the vector type.

As described above, the operation system D is selected in the case where the operation area cannot be touched or in the case where the operation area is brittle. For example, in the case where the operation area is configured by a material having a high temperature such as a heated cooking utensil, the operation system D is selected.

In the operation system D, the binary type operation data is input by long-time hover. That is, the operation value (binary value) of the operation data is input according to the presence or absence of long-time hover. In other words, the operation value of the operation data is detected on the basis of the presence or absence of long-time hover.

Here, the long-time hover is an operation of keeping the fingertip stationary at a height within a predetermined range above an operation area 264 for a predetermined time or longer. The height of the fingertip is represented by the distance between the operation area 264 and the fingertip.

The continuous value type operation data is input by performing the long-time hover at a desired height. That is, the operation value (continuous values) of the operation data is input according to the height of the fingertip when the long-time hover is performed. In other words, the operation value of the operation data is detected on the basis of the height of the fingertip when the long-time hover is performed.

The directional type operation data is input by pointing the finger in a desired direction and performing the long-time hover. That is, the operation value (continuous values) of the operation data is input according to the orientation of the finger viewed from above the operation area 264 when the long-time hover is performed. In other words, the operation value of the operation data is detected on the basis of the orientation of the finger when the long-time hover is performed.

The vector type operation data is input by pointing the finger at a desired height and in a desired direction and performing the long-time hover. That is, the operation value (continuous values and direction) of the operation data is input according to the height and orientation of the fingertip when the long-time hover is performed. In other words, the continuous values of the operation data are detected on the basis of the height of the fingertip when the long-time hover is performed, and the direction of the operation data is detected on the basis of the orientation of the finger when the long-time hover is performed.

Note that, as described with reference to FIG. 16, one of the operation pattern (one of the operation systems A to C) of operating while touching the operation area or the operation pattern (operation system D) of operating without touching the operation area is selected on the basis of at least one of the temperature, dirtiness, or brittleness of the operation area.

Then, the operation pattern control unit 33 selects the operation pattern to be applied to the operation area on the basis of a combination of the operation data type set in the operation area and the selected operation system. In this way, the operation pattern suitable for each operation area is selected on the basis of the characteristic of each operation area.

Returning to FIG. 15, in step S152, the operation pattern control unit 33 sets a detection parameter on the basis of the characteristic parameters. For example, the operation pattern control unit 33 sets the detection parameter to be used in the operation pattern applied to the operation area on the basis of the characteristic parameters of the operation area.

Figure 22:
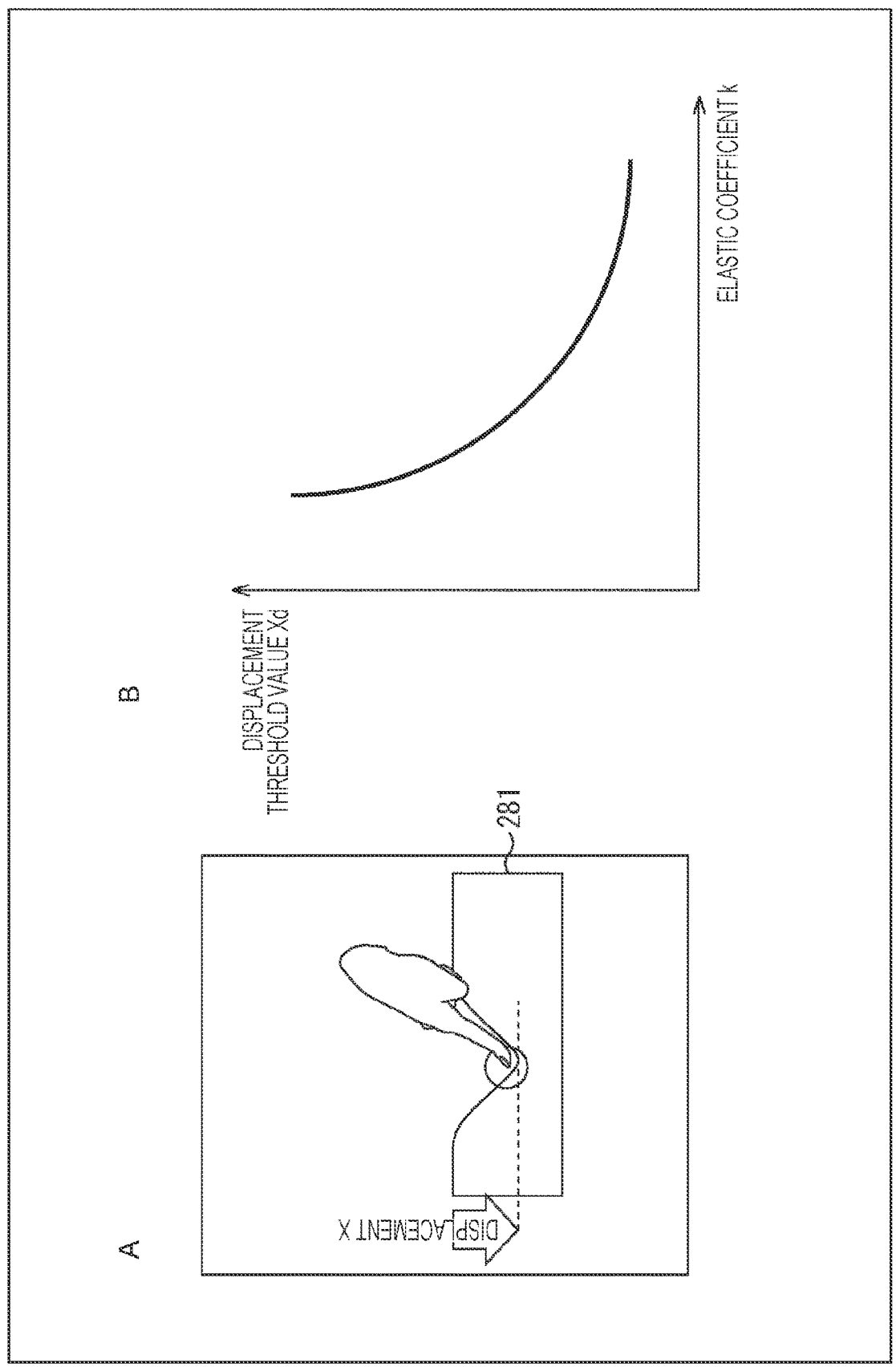
FIG. 22 is diagrams for describing a method of setting a displacement threshold value.

FIG. 22 illustrates an example of a method of setting a displacement threshold value Xd that is the detection parameter to be used in the pushing operation.

For example, as illustrated in A in FIG. 22, whether or not an operation area 281 is pushed is detected by comparing a displacement X indicating the pushing amount in the vertical direction with the displacement threshold value Xd. The displacement X is an amount of change in the vertical direction of the position on a surface of the operation area 281 by pushing the operation area 281. Then, when the displacement X of the operation area 281 becomes equal to or larger than the displacement threshold value Xd, the operation area 281 is determined to be pushed.

B in FIG. 22 is a graph illustrating a characteristic of the displacement threshold value Xd. The horizontal axis represents an elastic coefficient k, and the vertical axis represents the displacement threshold value Xd. The displacement threshold value Xd is inversely proportional to the elastic coefficient k and is calculated by, for example, the following equation (1).

$$Xd = Ad/k \qquad (1)$$

Note that Ad is a predetermined coefficient.

Therefore, the smaller the elastic coefficient k of the operation area 281, that is, the more easily the operation area 281 is deformed, the larger the displacement threshold value Xd. That is, the pushing amount required for the pushing operation becomes large, and it is necessary to push the operation area 281 deeper.

Meanwhile, the larger the elastic coefficient k of the operation area 281, that is, the less easily the operation area 281 is deformed, the smaller the displacement threshold value Xd. That is, the pushing amount required for the pushing operation is reduced, and it is not necessary to deeply push the operation area 281.

Thereby, the user can input the operation data by pushing the operation area 281 with a substantially similar force regardless of the elastic coefficient (elastic modulus) of the operation area 281.

Figure 23:
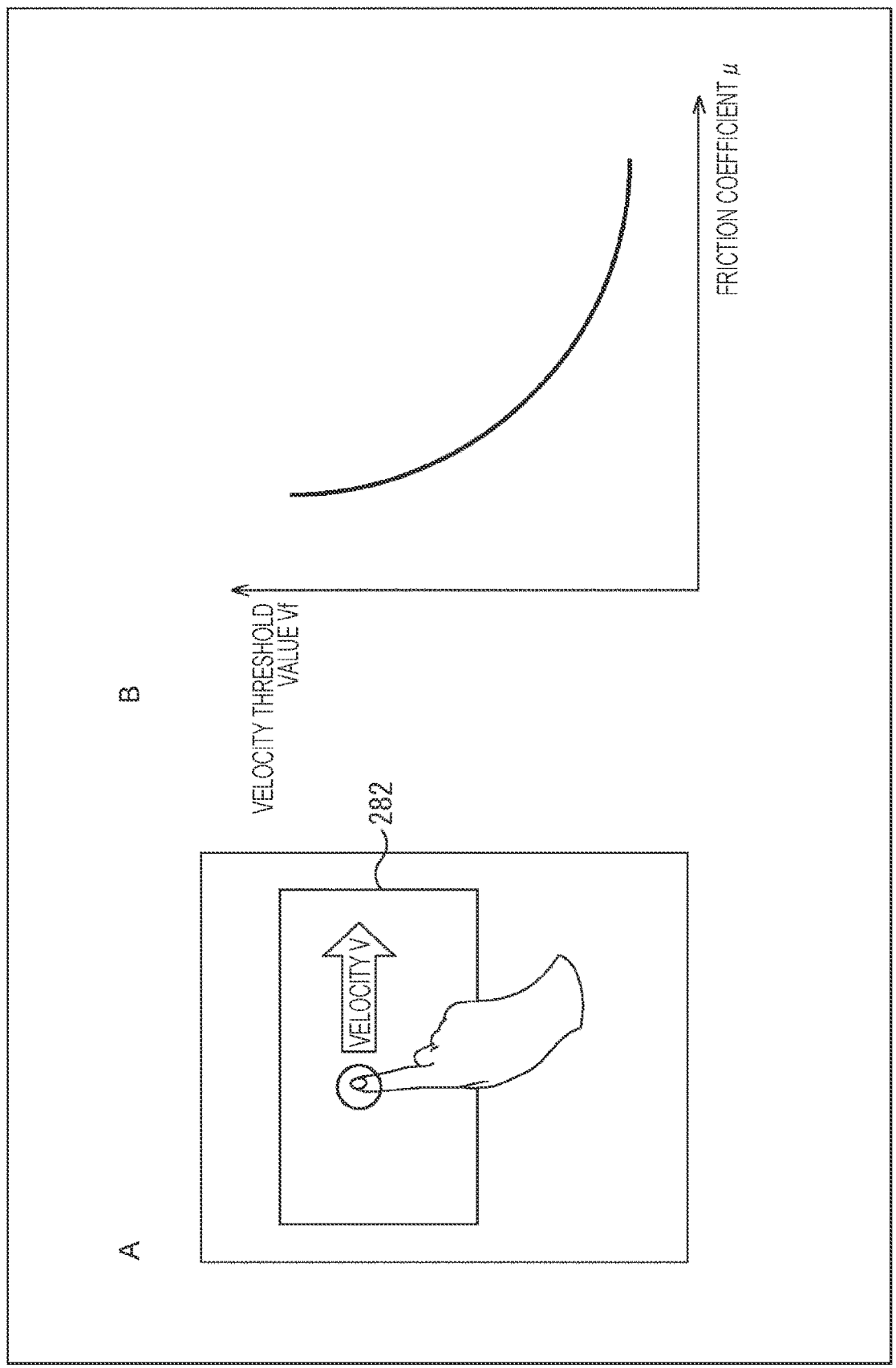
FIG. 23 is diagrams for describing a method of setting a velocity threshold value.

FIG. 23 illustrates an example of a method of setting a velocity threshold value Vf that is the detection parameter to be used in a flick operation. The flick operation is an operation of quickly flicking a finger in a desired direction after touching the operation area. In the example in FIG. 17, the flick operation is not applied to each operation system, but for example, the flick operation can be applied to the operation system C or the like.

As illustrated in A in FIG. 23, whether or not the flick is performed in the operation area 282 is detected by comparing a moving velocity V of the fingertip with the velocity threshold value Vf. Then, when the moving velocity V of the finger becomes equal to or higher than the velocity threshold value Vf, it is determined that the flick has been performed.

B in FIG. 23 is a graph illustrating a characteristic of the velocity threshold value Vf. The horizontal axis represents a friction coefficient $\mu$, and the vertical axis represents the velocity threshold value Vf.

The velocity threshold value Vf is inversely proportional to the friction coefficient $\mu$ and is calculated by, for example, the following equation (2).

$$Vf = Af/\mu \qquad (2)$$

Note that Af is a predetermined coefficient.

Therefore, the smaller the friction coefficient $\mu$ of the operation area 282, that is, the smaller the frictional force of the operation area 282, the larger the velocity threshold value Vf. That is, the moving velocity of the finger required for the flick operation becomes faster, and the finger is required to move faster.

Meanwhile, the larger the friction coefficient μ of the operation area 282, that is, the larger the frictional force of the operation area 282, the smaller the velocity threshold value Vf. That is, the moving velocity of the finger required for the flick operation becomes slow, and the finger is not required to move fast.

Thereby, the user can input the operation data by flicking the operation area 281 with a substantially similar force regardless of the friction coefficient (frictional force) of the operation area 282.

In this way, by adjusting the detection parameter on the basis of the characteristic parameters of the operation area, the user can operate the same operation pattern with substantially similar feeling regardless of the difference in the material of the operation area. Thereby, the operability is improved and erroneous detection of the operation data is prevented.

In step S153, the operation pattern control unit 33 applies the operation pattern to the operation area. Specifically, the operation pattern control unit 33 supplies the information indicating the operation pattern to be applied to the operation area to the execution unit 22 and the operation detection unit 34. The information indicating the operation pattern includes, for example, information regarding the method of inputting and the method of detecting the operation data, and information indicating the operation data type of the inputtable operation data. Furthermore, the information regarding the method of detecting the operation data includes the detection parameter set in the processing in step S152.

Note that, at this time, for example, the output unit 14 may output visual information for notifying the user of the set operation pattern (operation system) under the control of the output control unit 23.

For example, the output unit 14 may irradiate the operation area with light of a different color for each applied operation system under the control of the output control unit 23.

Figure 24:
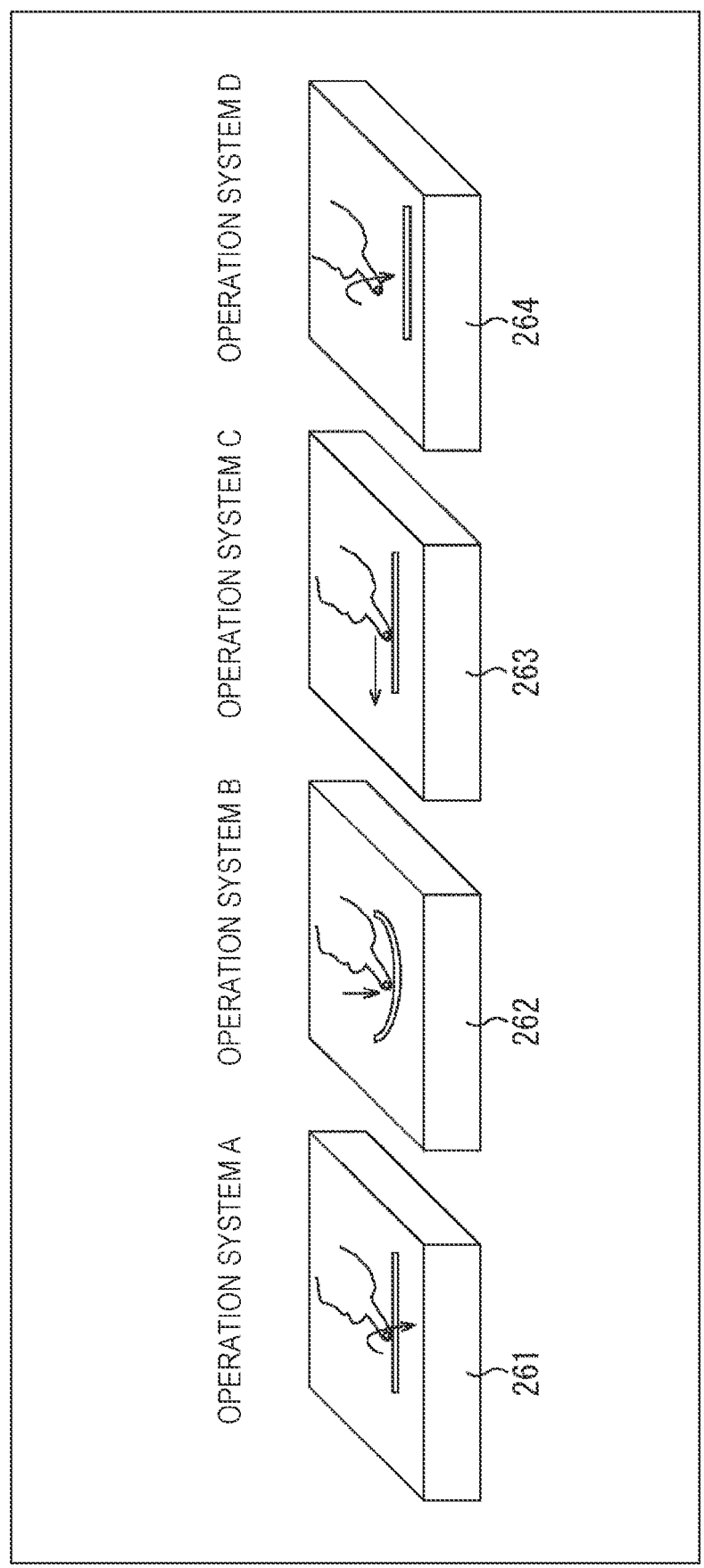
FIG. 24 is a diagram illustrating an example of a method of providing notification of a set operation system.

Furthermore, for example, the output unit 14 may project an image illustrating the applied operation system onto the operation area under the control of the output control unit 23, as illustrated in FIG. 24. In the example in FIG. 24, the operation system A to the operation system D are applied to the operation area 261 to the operation area 264, respectively, and images schematically illustrating the methods of inputting the operation data are respectively projected.

Thereafter, the operation pattern setting processing ends.

As described above, the operation area is automatically set on the basis of the preset conditions, and an appropriate operation pattern is set according to the characteristics of the operation area. Then, the user operation is performed according to the set operation pattern, and the operation data is detected.

Thereby, the user operation can be performed on surfaces of various objects around the body. Furthermore, since the operation pattern is set according to the characteristics of the object (operation area), the operability is improved and erroneous operation can be suppressed.

2. Application

Next, application of the information processing system 1 will be described with reference to FIGS. 25 to 36.

Example Applied to Piano Performance System

Figure 25:
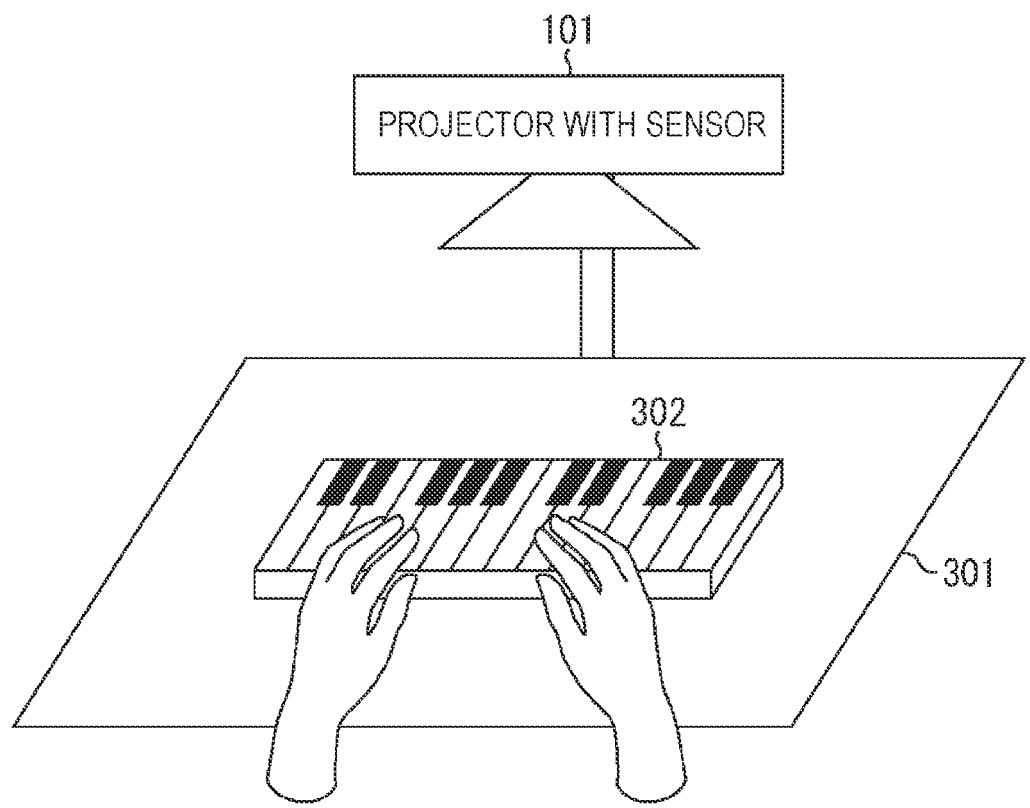
FIG. 25 is a diagram for describing an example in which the information processing system is applied to a piano performance system.

First, an example in which the information processing system 1 is applied to a piano performance system will be described with reference to FIGS. 25 and 26.

In this example, an image of a piano keyboard is projected on a surface of an object to be operated 302 placed on a desk 301 by the projector with sensor 101 described above with reference to FIG. 2.

In this case, for example, each keyboard is recognized as a different operation area. Then, a corresponding pitch is assigned to each keyboard. Furthermore, since adjustment of a volume is necessary for each keyboard, the operation data type of each operation area is set to the continuous value type. Moreover, the operation pattern applied to each keyboard is set on the basis of the material of the object to be operated 302 and the like.

Figure 26:
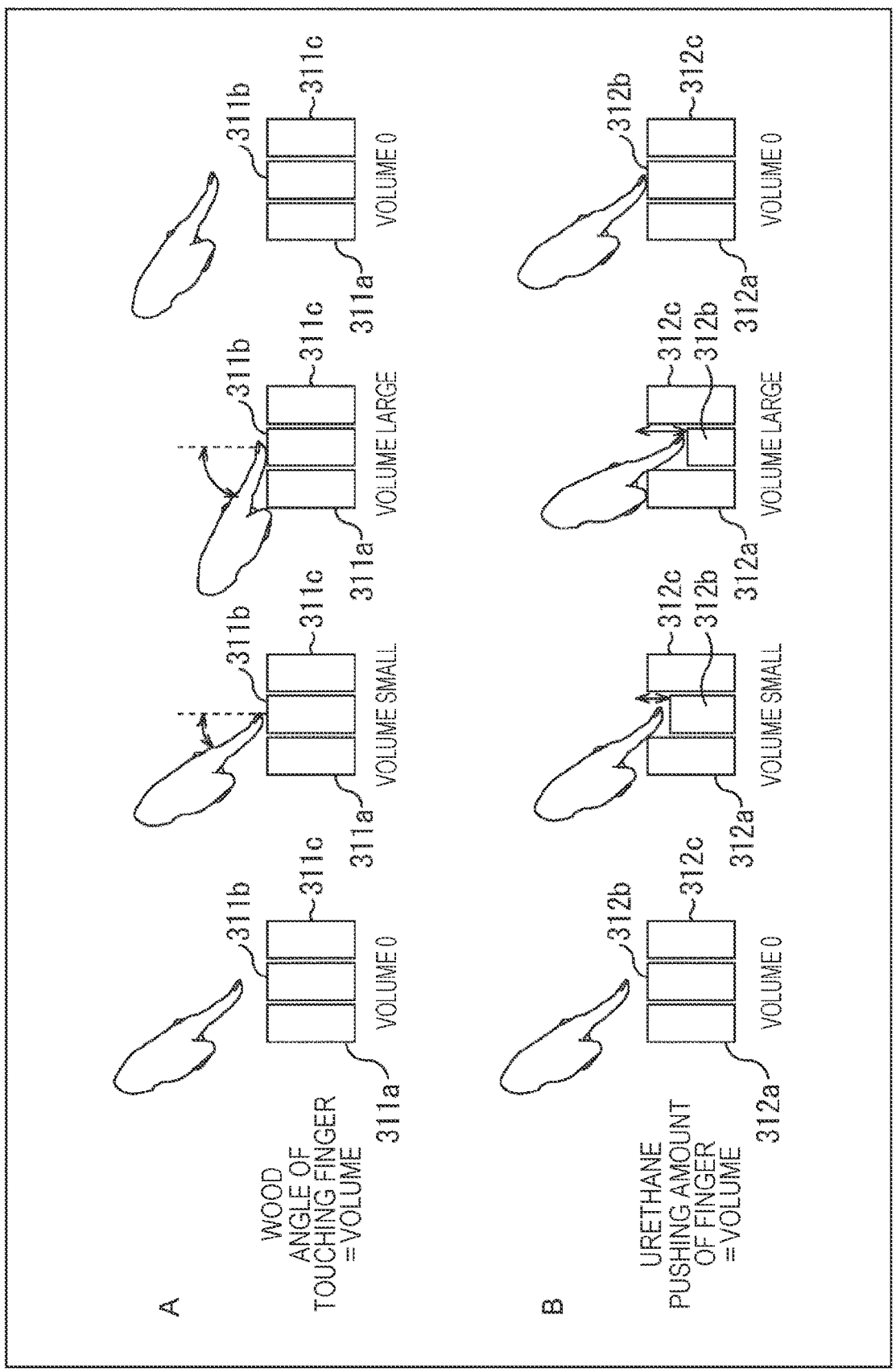
FIG. 26 is diagrams for describing examples in which the information processing system is applied to the piano performance system.

FIG. 26 illustrates examples comparing the operation patterns in a case where the object to be operated 302 is formed using wood and in a case where the object to be operated 302 is formed using urethane. A in FIG. 26 illustrates an example of the case where the object to be operated 302 is formed using wood and B in FIG. 26 illustrates an example of the case where the object to be operated 302 is formed using urethane.

In the case where the object to be operated 302 is formed using wood, the surface of wood is so hard that the surface cannot be pushed in like a piano keyboard. Therefore, for example, the continuous value type operation pattern of the operation system A in FIG. 17 is applied to each keyboard.

For example, in a case where the user operates a keyboard 311b from among keyboards 311a to 311c, the user touches the keyboard 311b. Thereby, the sound of the pitch corresponding to the keyboard 311b is output. Furthermore, the user can adjust the volume by adjusting an angle of a finger when touching the keyboard 311b.

In this way, even if an object formed using a hard material such as wood is used as the object to be operated 302, piano performance can be reproduced.

B in FIG. 26 illustrates an example of the case where the material of the object to be operated 302 is urethane.

In the case where the object to be operated 302 is formed using urethane, the surface of urethane has large elasticity, so that the surface can be pushed in like a piano keyboard. Therefore, for example, the continuous value type operation pattern of the operation system B in FIG. 17 is applied to each keyboard.

For example, in a case where the user operates a keyboard 312b from among keyboards 312a to 312c, the user pushes the keyboard 312b. Thereby, a sound of a pitch corresponding to the keyboard 312b is output. Furthermore, the user can adjust the volume by adjusting the amount of pushing the keyboard 312b in the vertical direction.

In this way, by using an object with high elasticity as the object to be operated 302, operability closer to an actual piano can be implemented.

Example Applied to Image Viewer

Figure 27:
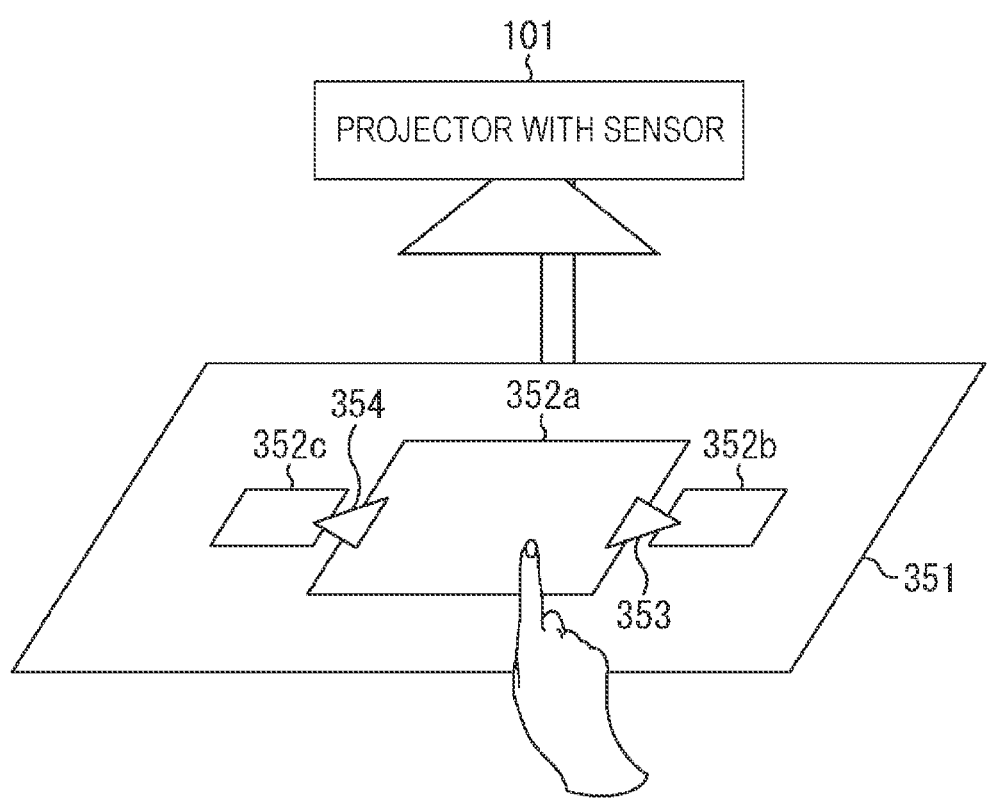
FIG. 27 is a diagram for describing an example in which the information processing system is applied to an image viewer.

Next, an example in which the information processing system 1 is applied to an image viewer will be described with reference to FIG. 27.

In this example, an image is projected on an image area 352a to an image area 352c on a desk 351 by a projector with sensor 101 described with reference to FIG. 2.

The image area 352a is located in the center of a top surface of the desk 351. The image area 352b is smaller than the image area 352a and is arranged on the right side of the image area 352a. The image area 352c has substantially the same size as the image area 352b and is arranged on the left side of the image area 352a. A right-pointing arrow 353 is displayed between the image area 352a and the image area 352b, and a left-pointing arrow 354 is displayed between the image area 352a and the image area 352c.

In this case, the image area 352a is set as the operation area. Then, when an operation of indicating a right direction is performed with respect to the image area 352a, the images displayed in the image area 352a to the image area 352c are shifted to the right direction. That is, the images displayed in the image area 352a and the image area 352c are moved to the image area 352b and the image area 352a, respectively, and the next image of the image displayed in the image area 352c is displayed in the image area 352c. Meanwhile, when an operation of indicating a left direction is performed with respect to the image area 352a, the images displayed in the image area 352a to the image area 352c are shifted to the left direction. That is, the images displayed in the image area 352a and the image area 352b are moved to the image area 352c and the image area 352a, respectively, and the previous image of the image displayed in the image area 352b is displayed in the image area 352b.

In this way, since the operation indicating a direction is performed with respect to the image area 352b that is the operation area, the operation data type of the image area 352b is set to the direction type. Then, the operation pattern is set according to the material of the top surface of the desk 351 that is the object to be operated.

For example, in a case where the top surface of the desk 351 is formed using acrylic, the acrylic has small elasticity and small frictional force, so that the directional type operation pattern of the operation system C in FIG. 17 is applied. Furthermore, in the case where the top surface of the desk 351 is formed using wood, the elasticity of the wood is small and the frictional force is not so large, so the directional type operation pattern of the operation system C in FIG. 17 is applied, similarly to the case of the desk 351 with the acrylic-made top surface.

Therefore, in the case where the top surface of the desk 351 is formed using acrylic or wood, the images displayed in the image area 352a to the image area 352c are shifted in the right direction by the user swiping to the right direction in the image area 352b. Therefore, the images displayed in the image area 352a to the image area 352c are shifted in the left direction by the user swiping to the left direction in the image area 352b.

Here, the wooden top plate has larger frictional force than the acrylic top plate. Therefore, in the case of the wooden top plate, a distance threshold value used to detect the swipe operation is set to a smaller value than in the case of the acrylic top plate. Therefore, in the case of the wooden top plate, the moving distance of the finger recognized as the swipe operation is shorter than in the case of the acrylic top plate.

In this way, by adjusting the distance threshold value according to the frictional force of the top surface of the desk 351 (image area 352b), the swipe operation can be performed with substantially the same operation feeling regardless of the material of the top surface of the desk 351. That is, the user can shift the displayed image by swiping the image area 352b with substantially the same force.

Meanwhile, in a case of not adjusting the distance threshold value, for example, in a case where the frictional force of the top surface of the desk 351 is moderate, when the user performs the swipe operation with the same feeling as a case where the frictional force of the top surface of the desk 351 is small, the swipe operation may not be detected. As a result, the user has to redo the swipe operation many times.

Note that, for example, in a case where a cloth mat is laid on the top plate of the desk 351, the cloth mat serves as the object to be operated. The cloth mat has high frictional force, and it is difficult to perform the swipe operation. Therefore, for example, the directional type operation pattern of the operation system A in FIG. 17 is applied.

Therefore, for example, when the user points its finger to the right direction and touches the image area 352a, the displayed image is shifted to the right direction. Furthermore, when the user points its finger to the left direction and touches the image area 352a, the displayed image is shifted to the left direction.

In this way, the shift operation for an image becomes possible even on the object to be operated formed using a material with large frictional force.

Example Applied to Remote Controller

Figure 28:
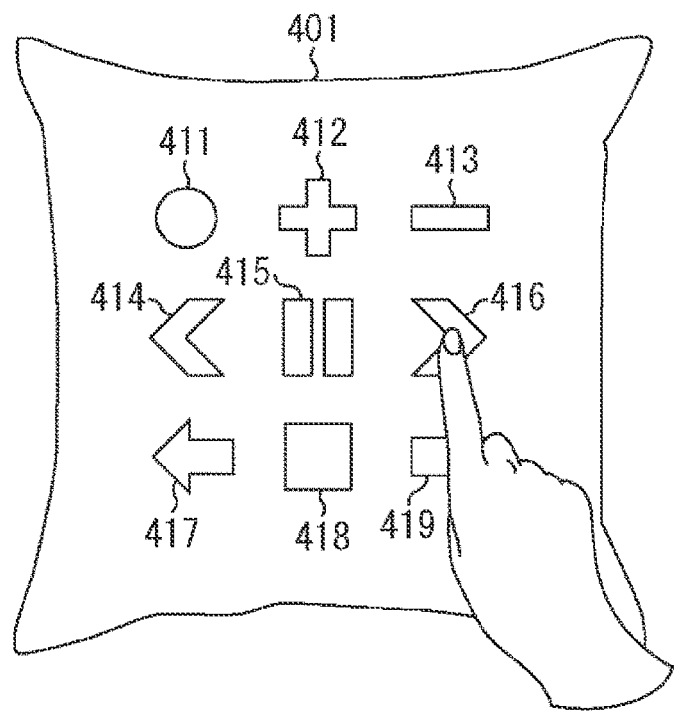
FIG. 28 is a diagram for describing an example in which the information processing system is applied to a remote controller.

Next, an example in which the information processing system 1 is applied to a remote controller will be described with reference to FIGS. 28 to 30.

In this example, a cushion 401 is used for the remote controller. For example, a flexible display (not illustrated) is embedded in the cushion 401, and buttons 411 to 419 displayed on a display are transmitted through a surface of the cushion 401. This display corresponds to the output unit 14 of the information processing system 1 in FIG. 1.

Furthermore, a bending sensor, a pressure sensor, and a depth sensor (not illustrated) are embedded in the cushion 401. Then, each sensor detects the pushing amount with respect to the buttons 411 to 419. The detection data detected by each sensor is, for example, wirelessly transmitted to the information processing unit 13. Each of these sensors corresponds to the detection unit 12 of the information processing system 1 in FIG. 1. Note that all the bending sensor, the pressure sensor, and the depth sensor do not necessarily have to be provided, and the sensors can be reduced within a range where the pushing amount with respect to the buttons 411 to 419 can be detected.

The information processing unit 13 controls the operation of a device to be operated (for example, a television device) in response to the pressing of the buttons 411 to 419, for example. In this way, the cushion 401 can be used as a remote controller for the device to be operated.

Note that it is usually difficult to recognize the material of the cushion 401 from an image. Therefore, for example, the elasticity of the cushion 401 is estimated by the method described above with reference to FIGS. 13 and 14.

Furthermore, the operation pattern for each button may be changed on the basis of the elasticity of the cushion 401.

Figure 29:
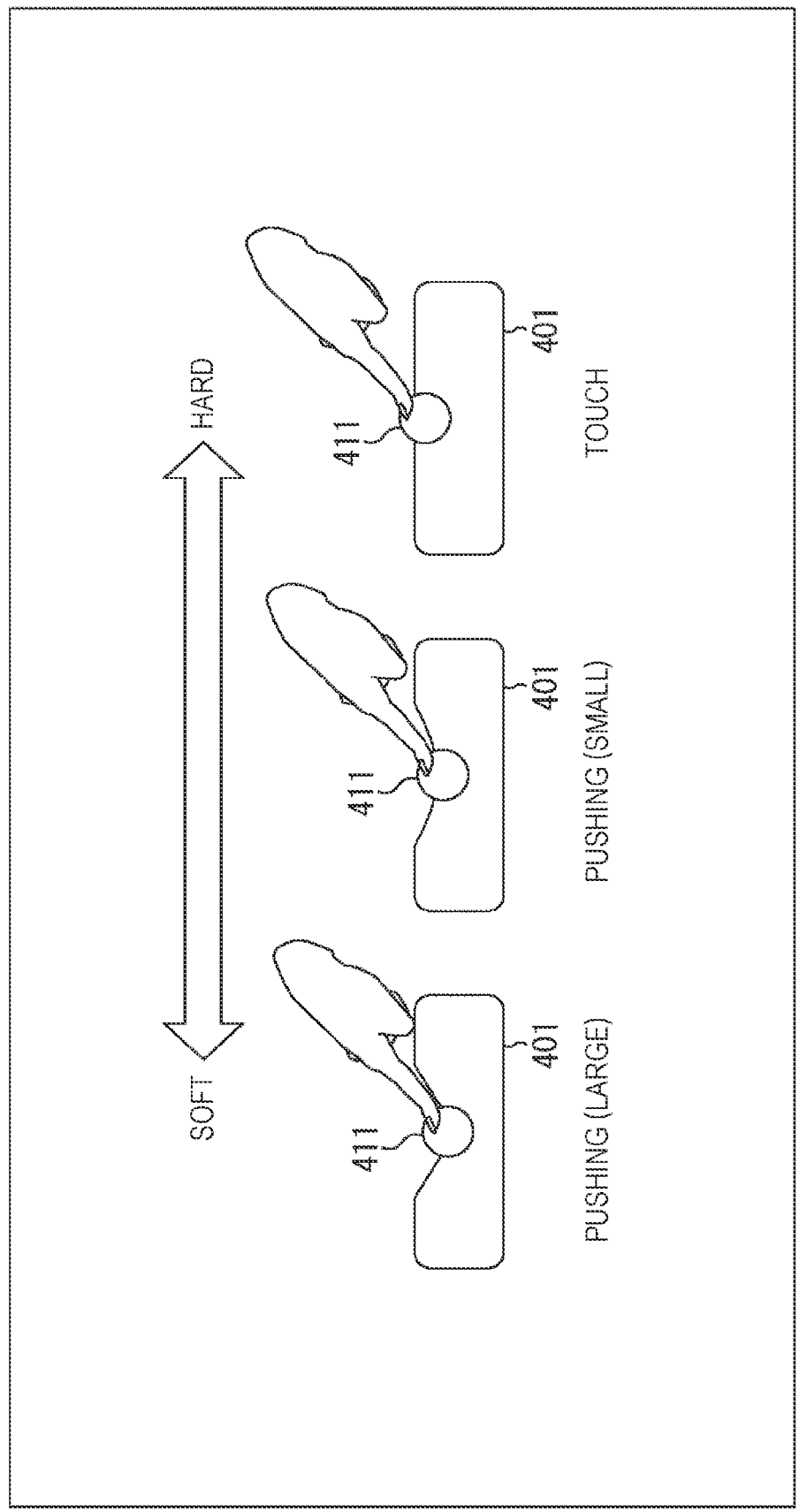
FIG. 29 is a diagram for describing the example in which the information processing system is applied to a remote controller.

FIG. 29 illustrates an example of the operation pattern of the button 411 used for inputting the binary type operation data. For example, the operation pattern is changed on the basis of the elasticity of a portion of the button 411 of the cushion 401.

For example, in a case where the portion of the button 411 is soft (the elasticity is large), the operation on the button 411 is detected by pushing the button 411 greatly (deeply). For example, in a case where the softness of the portion of the button 411 is medium (the elasticity is medium), the operation on the button 411 is detected by pushing the button 411 small (shallow). For example, in a case where the portion of the button 411 is hard (the elasticity is small), the operation on the button 411 is detected by touching the button 411, in other words, by contacting the button 411.

Figure 30:
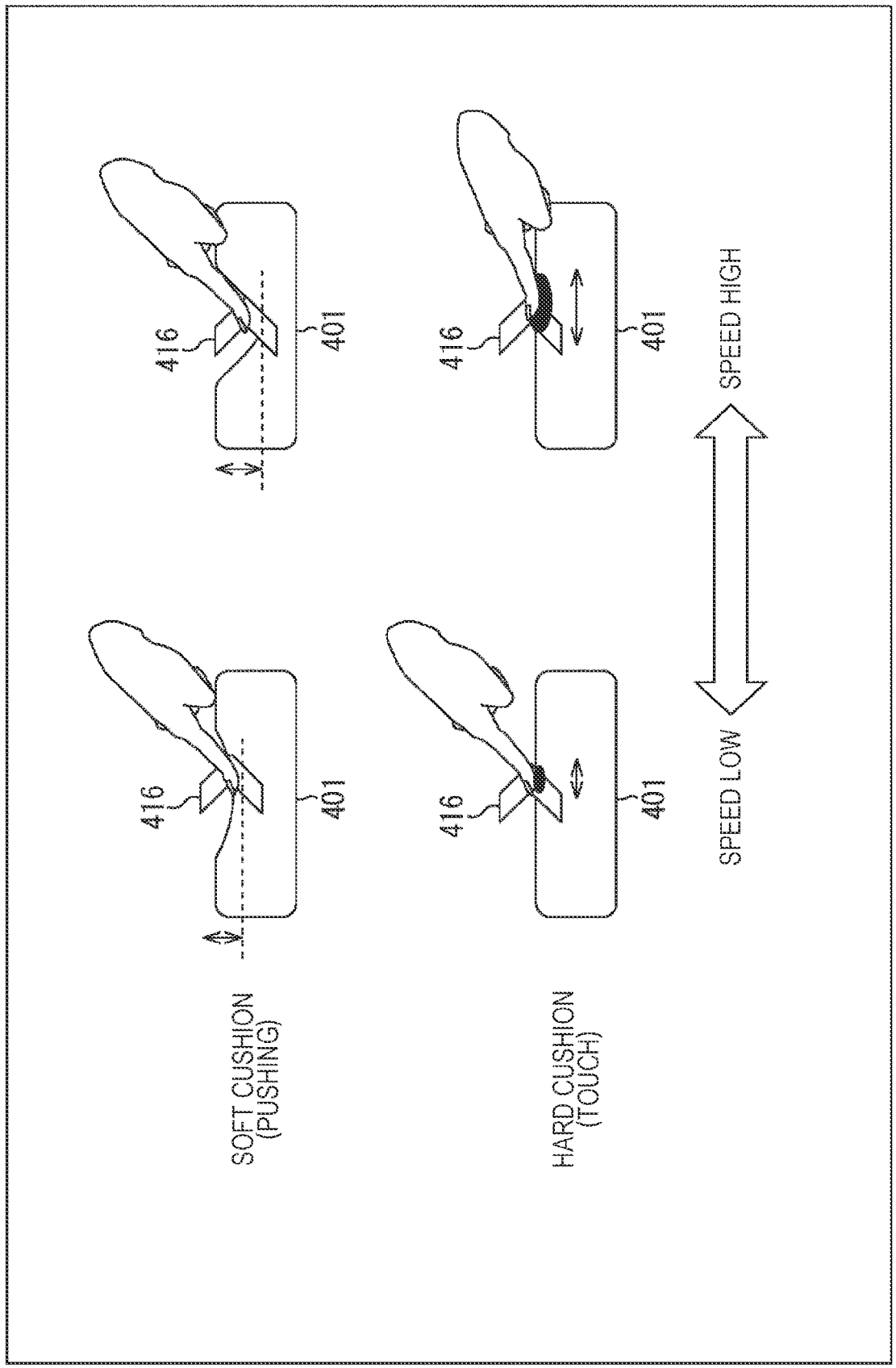
FIG. 30 is a diagram for describing the example in which the information processing system is applied to a remote controller.

FIG. 30 illustrates an example of the operation pattern of the button 416 used for inputting the continuous value type operation data. For example, the operation pattern is changed on the basis of the elasticity of a portion of the button 416 of the cushion 401.

For example, in a case where the portion of the button 416 is soft (the elasticity is large), fast-forward speed is controlled on the basis of the pushing amount with respect to the button 416. For example, the smaller the pushing amount with respect to the button 416, the slower the fast-forward speed, and the larger the pushing amount with respect to the button 416, the faster the fast-forward speed.

For example, in a case where the portion of the button 416 is hard (the elasticity is small), the fast-forward speed is controlled on the basis of an inclination of a finger when touching the button 416. For example, the fast-forward speed becomes slower as the inclination of the finger becomes smaller and a contact area of the finger to the button 416 is smaller, and the fast-forward speed becomes faster as the inclination of the finger becomes larger and the contact area of the finger to the button 416 becomes larger.

In this way, the operability is improved by changing the operation pattern according to the elasticity of the cushion 401. For example, in the case where the cushion 401 is hard, the cushion 401 can be operated without being forcibly pushed.

Note that, there is a case where the elasticity greatly differs depending on the position of the cushion 401, similarly to the case of B in FIG. 14. Therefore, the operation pattern may be changed or the detection parameter such as the pushing amount may be changed depending on the elasticity of the button position.

Example Applied to AR System

Next, an example in which the information processing system 1 is applied to an AR system will be described with reference to FIGS. 31 to 35.

Figure 31:
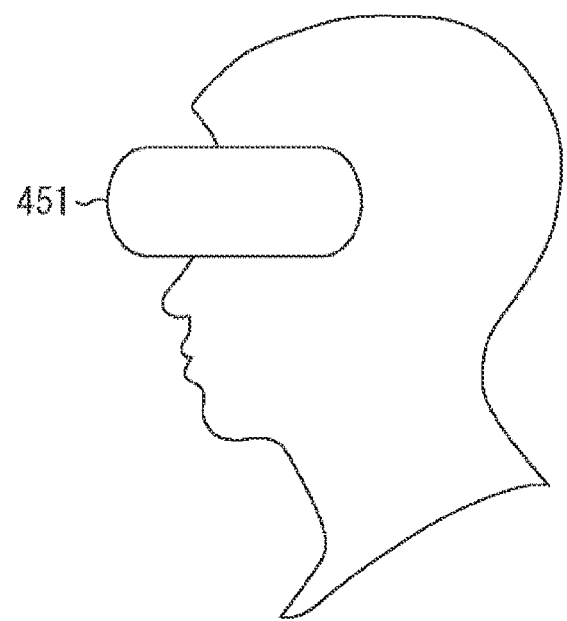
FIG. 31 is a diagram for describing an example in which the information processing system is applied to an AR system.

In this example, for example, as illustrated in FIG. 31, the user can browse information of cooking utensils, tableware, and foodstuffs selected in a dining room, a kitchen, or the like by wearing AR glasses 451.

The AR glasses 451 correspond to the detection unit 12 and the output unit 14 of the information processing system 1 in FIG. 1. For example, the AR glasses 451 are provided with a depth sensor and a thermography. Then, the depth sensor acquires three-dimensional image data in a user's field of view, and the thermography measures the temperature of each object in the user's field of view. Furthermore, the AR glasses 451 superimpose and display various types of information in the user's field of view.

Figure 32:
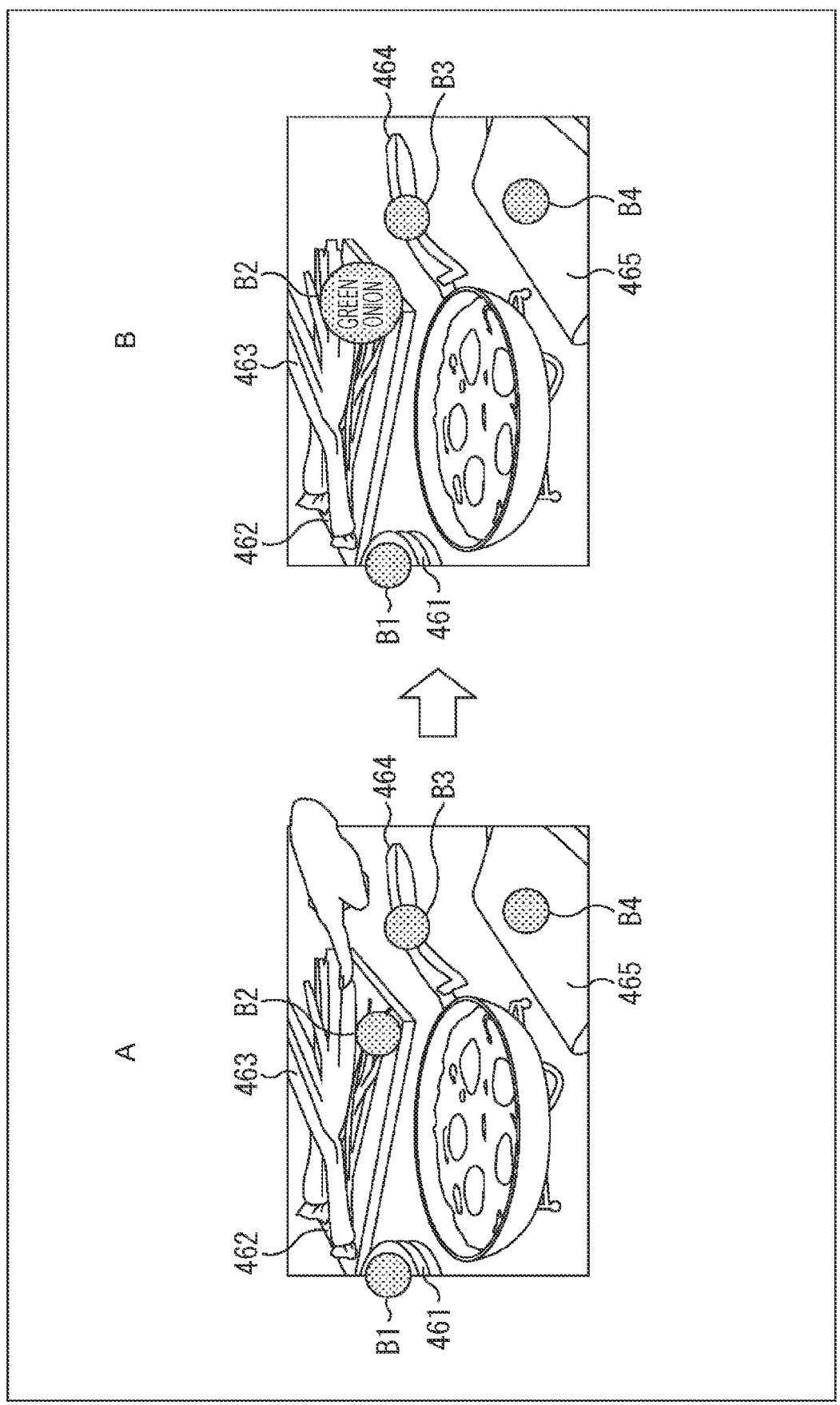
FIG. 32 is a diagram for describing the example in which the information processing system is applied to an AR system.

For example, FIG. 32 schematically illustrates a state of the user's field of view as viewed through the AR glasses 451.

As illustrated in this example, the buttons are superimposed and displayed on each object in the user's field of view. For example, in the example of A in FIG. 32, a button B1 is displayed on a plate 461, a button B2 is displayed on a green onion 463 on a cutting board 462, and a button B3 is displayed on a handle of a frying pan 464, and a button B4 is displayed on a cloth 465.

Then, for example, when the user points to each button that is an operation area, information regarding the object corresponding to each button is displayed. For example, in the example of B in FIG. 32, characters "green onion" are displayed in the button B2 by selecting the button B2 corresponding to the green onion 463. Therefore, the operation data type of each button is set to the on or off binary type.

Here, in the dining room and kitchen, there are objects that are easy to touch with fingers and objects that are difficult to touch.

Figure 33:
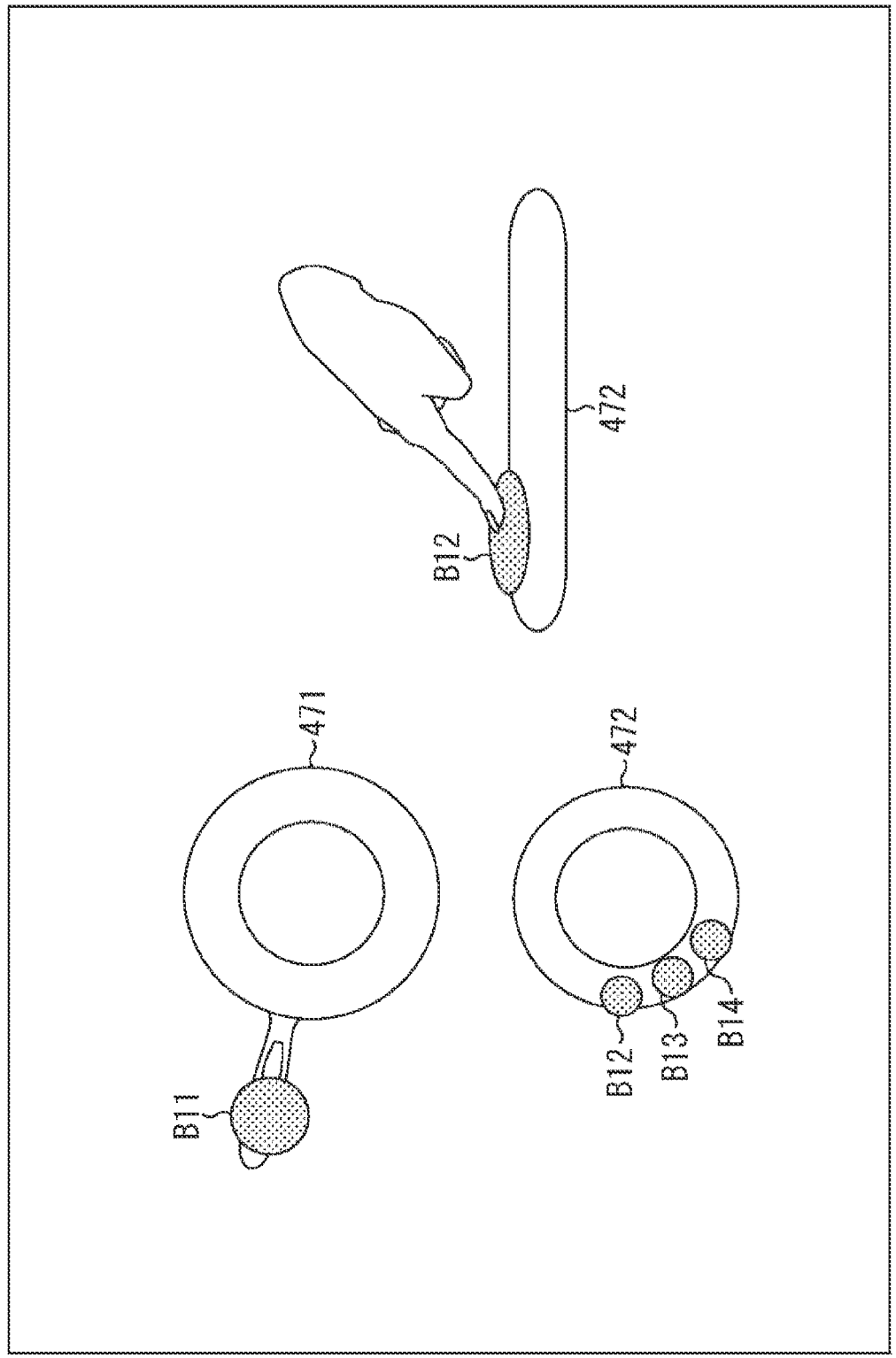
FIG. 33 is a diagram for describing the example in which the information processing system is applied to an AR system.

For example, the handle of a frying pan 471 in FIG. 33 and a dish 472 without food are easy to touch with fingers. Therefore, for example, the binary type operation pattern of the operation system C is applied to the button B11 on the handle of the frying pan 471 and the buttons B11 to B12 on the dish 472. Thereby, for example, the information regarding the dish 472 is displayed by touching the button B12, as illustrated in the right figure.

Figure 34:
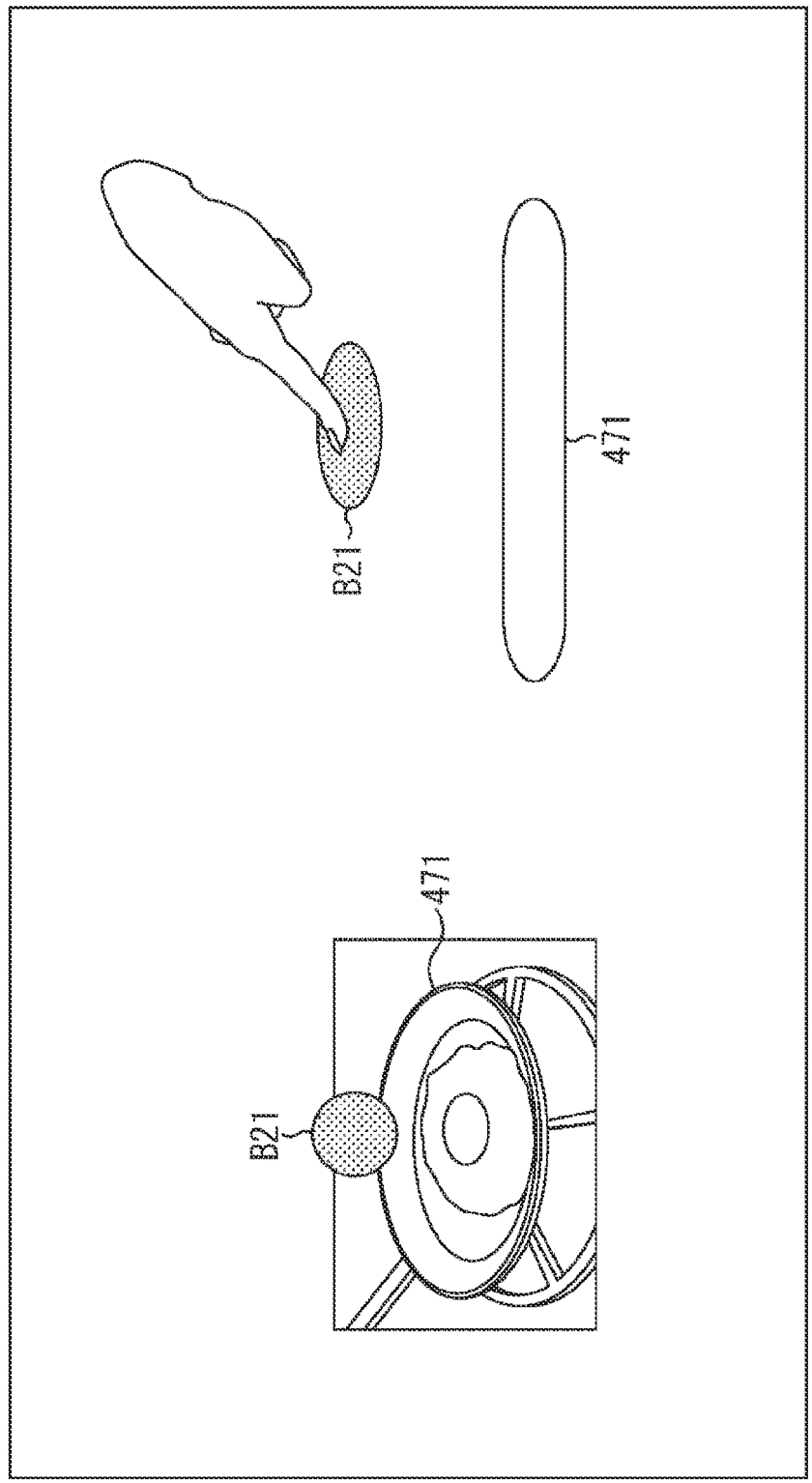
FIG. 34 is a diagram for describing the example in which the information processing system is applied to an AR system.

Meanwhile, for example, as illustrated in FIG. 34, the frying pan 471 being cooked is hot and difficult to touch. Therefore, for example, as illustrated in this figure, the button B21 is displayed in the air above the operation area of the handle of the frying pan 471. Then, the user designates the button B21 by stopping the fingertip on the button B21 for a predetermined time or longer, that is, by long-time hover. Thereby, the information regarding the frying pan 471 or the food in the frying pan 471 is displayed. Note that, in this example, an area on the frying pan 471 under the button B21 is the operation area, and by designating the button B21, a hover operation for the operation area is performed.

Figure 35:
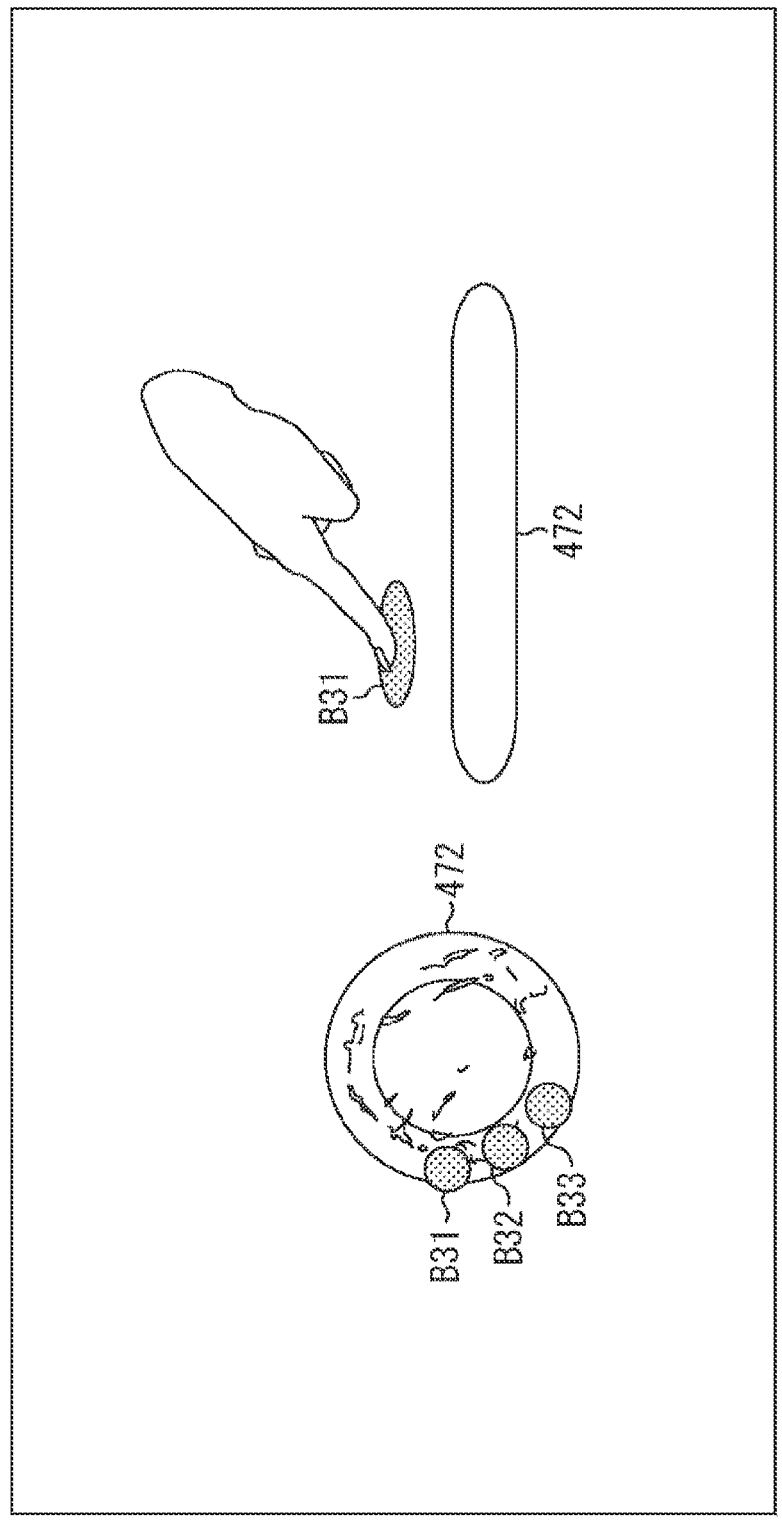
FIG. 35 is a diagram for describing the example in which the information processing system is applied to an AR system.

Furthermore, for example, as illustrated in FIG. 35, a dish 472 after eating is dirty and difficult to touch. Thus, for example, as illustrated in this figure, buttons B31 to B33 are displayed in the air above the operation area of the dish 472. Then, as illustrated in the right figure, the user designates the button B31 by stopping the fingertip on the button B31 for a predetermined time or longer, that is, by long-time hover. Thereby, the information regarding the dish 472 is displayed. Note that, in this example, an area on the dish 472 under the buttons B31 to B33 is the operation area, and by designating any of the buttons B31 to B33, the hover operation for each operation area is performed.

In this way, it is possible to set and operate an operation area even for an object that is difficult to touch due to high temperature or dirt.

Example Applied to Trackpad

Figure 36:
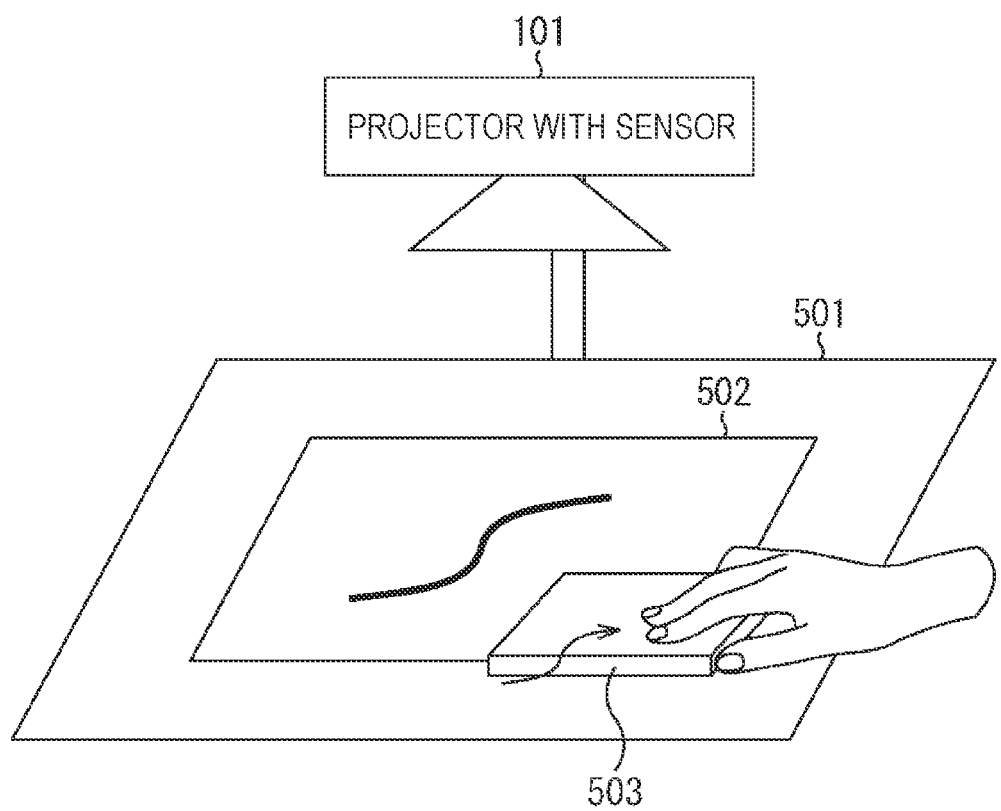
FIG. 36 is a diagram for describing an example in which the information processing system is applied to a trackpad.

Next, an example in which the information processing system 1 is applied to a virtual trackpad will be described with reference to FIG. 36.

In this example, an image 502 is projected onto a desk 501 by the projector with sensor 101 described with reference to FIG. 2. Furthermore, an object to be operated 503 is placed on the desk 501, and a surface of the object to be operated 503 is used as a trackpad. Then, the depth sensor included in the projector with sensor 101 captures a state in which the user operates the surface of the object to be operated 503, and detects the user operation. Furthermore, display content of the image 502 is updated on the basis of the user operation.

In a normal trackpad, for example, binary operations such as clicking, continuous value operations such as volume adjustment, and vector operations such as dragging are performed. Therefore, the binary type, the continuous value type, and the vector type operation data type are applied to the surface of the object to be operated 503 that is an operation area.

Then, for example, in a case where the object to be operated 503 is an object having a large frictional force such as a cloth, the operation system A is applied. For example, in a case of inputting binary type operation data, the user touches the surface of the object to be operated 503. For example, in a case of inputting continuous value type operation data, the user tilts its finger by an angle corresponding to a desired value and touches the surface of the object to be operated 503. For example, in a case of inputting vector type operation data, the user points its finger in a desired direction and tilts its finger by an angle corresponding to a desired value, and touches the surface of the object to be operated 503.

For example, in a case where the object to be operated 503 is an object having large elasticity such as urethane, the operation system B is applied. For example, in a case of inputting binary type operation data, the user pushes the surface of the object to be operated 503 in the vertical direction to a predetermined depth or more. For example, in a case of inputting continuous value type operation data, the user pushes the surface of the object to be operated 503 to a depth corresponding to a desired value. For example, in a case of inputting vector type operation data, the user points its finger in a desired direction and pushes the surface of the object to be operated 503 to a depth corresponding to a desired value.

For example, in a case where the object to be operated 503 is an object that is hard and has small frictional force such as glass, the operation system C is applied. For example, in a case of inputting binary type operation data, the user touches the surface of the object to be operated 503. For example, in a case of inputting continuous value type operation data, the user drags the surface of the object to be operated 503 by a distance corresponding to a desired value. For example, in a case of inputting vector type operation data, the user drags the surface of the object to be operated 503 in a desired direction by a distance corresponding to a desired value.

For example, in a case where the object to be operated 503 is dirty, the operation system D is applied. For example, in a case of inputting binary type operation data, the user performs long-time hover above the object to be operated 503. For example, in a case of inputting continuous value type operation data, the user performs long-time hover above the object to be operated 503 at a height corresponding to a desired value. For example, in a case of inputting vector type operation data, the user points its finger in a desired direction above the object to be operated 503 and performs long-time hover at a height corresponding to a desired value.

In this way, by applying the operation pattern suitable for the material of the object to be operated 503 or the like, comfortable operation that makes the best use of the characteristics of the object to be operated 503 becomes possible.

3. Modification

Hereinafter, modifications of the above-described embodiment of the present technology will be described.

The above-described operation patterns are examples of the embodiment, and the content and number of operation patterns can be changed as appropriate. For example, a continuous value or the like may be input on the basis of the contact area of the finger in the operation area or the like.

Furthermore, the characteristics of the operation area (the surface of the object to be operated) used for setting the above-described operation pattern are example, and the type and number of characteristics can be changed as appropriate.

Moreover, the above-described operation data types are examples, and the type and number of operation data types can be changed as appropriate.

Furthermore, the types of material illustrated in FIG. 10 are examples, and the type and number of materials can be changed as appropriate. Moreover, for example, it is also possible to make the material classification finer or coarser. For example, it is possible to further classify materials according to the type of wood or the like.

Furthermore, for example, the operation pattern may be set on the basis of, for example, the use of the operation data, in addition to the characteristics of the operation area. For example, in a case where the operation data is used to control the movement in an up-down direction, the operation pattern for pushing the operation area (for example, a virtual button) is selected, and in a case where the operation data is used to control the movement in a front-back direction or a right-left direction, the operation pattern for moving the operation object on the operation area (for example, a virtual trackpad) may be selected. Thereby, the user can perform the operation without feeling a sense of discomfort.

4. Others

Configuration Example of Computer

The series of processing described above can be executed by hardware or software. In the case of executing the series of processing by software, a program that configures the software is installed in a computer. Here, examples of the computer include a computer incorporated in dedicated hardware, and a general-purpose personal computer or the like capable of executing various functions by installing various programs, for example.

FIG. 37 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an image sensor, and the like. The output unit 1007 includes a display, a speaker, and the like. The recording unit 1008 includes a hard disk, a nonvolatile memory, and the like. The communication unit 1009 includes a network interface, and the like. The drive 1010 drives a removable medium 1011 such as a magnetic disk, an optical disk, a magneto-optical disk, or a semiconductor memory.

In the computer 1000 configured as described above, the CPU 1001 loads, for example, a program recorded in the recording unit 1008 into the RAM 1003 and executes the program via the input/output interface 1005 and the bus 1004, thereby performing the above-described series of processing.

The program to be executed by the computer 1000 (CPU 1001) can be recorded on the removable medium 1011 as a package medium and the like, for example, and can be provided. Furthermore, the program can be provided via a wired or wireless transmission medium such as a local area network, the Internet, or digital satellite broadcast.

In the computer 1000, the removable medium 1011 is attached to the drive 1010, so that the program can be installed in the recording unit 1008 via the input/output interface 1005. Furthermore, the program can be received by the communication unit 1009 via a wired or wireless transmission medium and installed in the recording unit 1008. Other than the above method, the program can be installed in the ROM 1002 or the recording unit 1008 in advance.

Note that the program executed by the computer may be a program processed in chronological order according to the order described in the present specification or may be a program executed in parallel or at necessary timing such as when a call is made.

Furthermore, in the present specification, the term "system" means a group of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Moreover, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Combination Example of Configuration

The present technology may have the following configurations.

(1)
An information processing apparatus including:
an operation pattern control unit configured to control an operation pattern in an operation area on a surface of a real object on the basis of information indicating a characteristic of the operation area.

(2)
The information processing apparatus according to (1), in which
the operation pattern includes at least one of a method of inputting operation data in the operation area or a method of detecting the operation data.

(3)
The information processing apparatus according to (2), in which
the operation pattern control unit sets the method of inputting operation data on the basis of at least one of an elasticity or a frictional force of the operation area.

(4)
The information processing apparatus according to (3), in which,
in a case where the operation data is represented by continuous values, the operation pattern control unit selects which one of an inclination of an operation object with respect to the operation area, a pushing amount of the operation area, or a moving distance of the operation object on the operation area to use when inputting the continuous values.

(5)
The information processing apparatus according to (3) or (4), in which,
in a case where the operation data is represented by a direction, the operation pattern control unit selects which one of an orientation of an operation object when the operation object touches the operation area, an orientation of the operation object when the operation area is pushed by the operation object, or a moving direction of the operation object on the operation area to use when inputting the direction.

(6)
The information processing apparatus according to any one of (2) to (5), in which
the operation pattern control unit controls a detection parameter to be used to detect the operation data on the basis of information indicating a characteristic of the operation area.

(7)
The information processing apparatus according to (6), in which
the information indicating a characteristic of the operation area includes an elasticity, and the operation pattern control unit sets, on the basis of the elasticity of the operation area, a threshold value of a pushing amount to be used to detect the operation data input by pushing the operation area.

(8)
The information processing apparatus according to (6) or (7), in which
the information indicating a characteristic of the operation area includes a frictional force, and the operation pattern control unit sets, on the basis of the frictional force of the operation area, a threshold value of a moving distance or a moving velocity of an operation object to be used to detect the operation data input by moving the operation object on the operation area.

(9)
The information processing apparatus according to any one of (1) to (8), in which
the operation pattern control unit selects one of the operation pattern of operating while touching the operation area or the operation pattern of operating without touching the operation area on the basis of at least one of a dirt or a temperature of the operation area.

(10)
The information processing apparatus according to any one of (1) to (9), in which
the operation pattern control unit further sets the operation pattern on the basis of use of operation data input in the operation area.

(11)
The information processing apparatus according to any one of (1) to (10), further including:
a characteristic detection unit configured to detect a characteristic of the operation area on the basis of an image including the operation area.

(12)
The information processing apparatus according to (11), in which
the characteristic detection unit detects a characteristic parameter indicating a characteristic of the operation area on the basis of a material of the operation area recognized on the basis of the image, and
the operation pattern control unit sets the operation pattern in the operation area on the basis of the characteristic parameter.

(13)

The information processing apparatus according to (12), in which the characteristic detection unit detects the characteristic parameter on the basis of at least one of a state of the operation area or a state of an operation object of when a predetermined operation is performed for the operation area in a case where the material of the operation area is not able to be detected.

(14)

The information processing apparatus according to any one of (1) to (13), further including:

an operation area setting unit configured to set the operation area on the basis of an image including the real object.

(15)

The information processing apparatus according to any one of (1) to (14), further including:

an operation detection unit configured to detect operation data input in the operation area on the basis of a state of the operation area and a state of an operation object, and the operation pattern; and an execution unit configured to execute processing using the operation data.

(16)

The information processing apparatus according to any one of (1) to (15), further including:

an output control unit configured to control an output of visual information for notifying the set operation pattern in the operation area.

(17)

The information processing apparatus according to any one of (1) to (16), in which the characteristic of the operation area includes at least one of a property or a state of the operation area.

(18)

The information processing apparatus according to (17), in which the property of the operation area includes at least one of an elasticity, a frictional force, or a brittleness of the operation area, and the state of the operation area includes at least one of a dirt or a temperature in the operation area.

(19)

An information processing method including:

by an information processing apparatus, controlling an operation pattern in an operation area on a surface of a real object on the basis of information indicating a characteristic of the operation area.

(20)

A program for causing a computer to execute processing of:

controlling an operation pattern in an operation area on a surface of a real object on the basis of information indicating a characteristic of the operation area.

Note that the effects described in the present specification are merely examples and are not limited, and other effects may be exhibited.

REFERENCE SIGNS LIST

1 Information processing system
12 Detection unit
13 Information processing unit
14 Output unit
21 Operation control unit
22 Execution unit
23 Output control unit
31 Operation area setting unit
32 Characteristic detection unit
33 Operation pattern control unit
34 Operation detection unit
101, 111 Projector with sensor
121 Wearable terminal
451 AR glasses

The invention claimed is:

1. An information processing apparatus comprising:
a characteristic detection unit configured to detect a characteristic of an operation area on a surface of a real object; and
an operation pattern control unit configured to control select, from among a plurality of operation patterns, an operation pattern to be applied in the operation area on a basis of information indicating the characteristic of the operation area, wherein
the operation pattern includes a method of inputting operation data in the operation area, and
the characteristic detection unit and the operation pattern control unit are each implemented via at least one processor.

2. The information processing apparatus according to claim 1, wherein
the operation pattern further includes a method of detecting the operation data.

3. The information processing apparatus according to claim 2, wherein
the operation pattern control unit is further configured to set the method of inputting operation data on a basis of at least one of an elasticity or a frictional force of the operation area.

4. The information processing apparatus according to claim 3, wherein,
in a case where the operation data is represented by a direction, the operation pattern control unit is further configured to select which one of an orientation of an operation object when the operation object touches the operation area, an orientation of the operation object when the operation area is pushed by the operation object, or a moving direction of the operation object on the operation area to use when inputting the direction.

5. The information processing apparatus according to claim 2, wherein
the operation pattern control unit is further configured to control a detection parameter to be used to detect the operation data on a basis of the information indicating the characteristic of the operation area.

6. The information processing apparatus according to claim 5, wherein
the information indicating the characteristic of the operation area includes a frictional force, and the operation pattern control unit is further configured to set, on a basis of the frictional force of the operation area, a threshold value of a moving distance or a moving velocity of an operation object to be used to detect the operation data input by moving the operation object on the operation area.

7. The information processing apparatus according to claim 1, wherein
the operation pattern control unit is further configured to select one of the operation pattern of operating while touching the operation area or the operation pattern of operating without touching the operation area on a basis of at least one of a dirt or a temperature of the operation area.

8. The information processing apparatus according to claim 1, wherein
the operation pattern control unit is further configured to set the operation pattern on a basis of use of operation data input in the operation area.

9. The information processing apparatus according to claim 1, wherein
the characteristic detection unit is further configured to detect the characteristic of the operation area on a basis of an image including the operation area.

10. The information processing apparatus according to claim 1, further comprising:
an operation area setting unit configured to set the operation area on a basis of an image including the real object,
wherein the operation area setting unit is implemented via at least one processor.

11. The information processing apparatus according to claim 1, further comprising:
an operation detection unit configured to detect operation data input in the operation area on a basis of a state of the operation area and a state of an operation object, and the operation pattern; and
an execution unit configured to execute processing using the operation data,
wherein the operation detection unit and the execution unit are each implemented via at least one processor.

12. The information processing apparatus according to claim 1, further comprising:
an output control unit configured to control an output of visual information for providing notification of the operation pattern in the operation area;
wherein the output control unit is implemented via at least one processor.

13. The information processing apparatus according to claim 1, wherein
the characteristic of the operation area includes at least one of a property or a state of the operation area.

14. The information processing apparatus according to claim 13, wherein
the property of the operation area includes at least one of an elasticity, a frictional force, or a brittleness of the operation area, and
the state of the operation area includes at least one of a dirt or a temperature in the operation area.

15. An information processing apparatus comprising:
an operation pattern control unit configured to control an operation pattern in an operation area on a surface of a real object on a basis of information indicating a characteristic of the operation area, wherein
the operation pattern includes at least one of a method of inputting operation data in the operation area or a method of detecting the operation data,
the operation pattern control unit is further configured to set the method of inputting operation data on a basis of at least one of an elasticity or a frictional force of the operation area,
in a case where the operation data is represented by continuous values, the operation pattern control unit is further configured to select which one of an inclination of an operation object with respect to the operation area, a pushing amount of the operation area, or a moving distance of the operation object on the operation area to use when inputting the continuous values, and
the operation pattern control unit is implemented via at least one processor.

16. An information processing apparatus comprising:
an operation pattern control unit configured to control an operation pattern in an operation area on a surface of a real object on a basis of information indicating a characteristic of the operation area, wherein
the operation pattern includes at least one of a method of inputting operation data in the operation area or a method of detecting the operation data,
the operation pattern control unit is further configured to control a detection parameter to be used to detect the operation data on a basis of the information indicating the characteristic of the operation area,
the information indicating the characteristic of the operation area includes an elasticity, and the operation pattern control unit is further configured to set, on a basis of the elasticity of the operation area, a threshold value of a pushing amount to be used to detect the operation data input by pushing the operation area, and
the operation pattern control unit is implemented via at least one processor.

17. An information processing apparatus comprising:
an operation pattern control unit configured to control an operation pattern in an operation area on a surface of a real object on a basis of information indicating a characteristic of the operation area; and
a characteristic detection unit configured to
detect a characteristic of the operation area on a basis of an image including the operation area, and
detect a characteristic parameter indicating the characteristic of the operation area on a basis of a material of the operation area recognized on a basis of the image, wherein
the operation pattern control unit is further configured to set the operation pattern in the operation area on a basis of the characteristic parameter, and
wherein the operation pattern control unit and the characteristic detection unit are each implemented via at least one processor.

18. The information processing apparatus according to claim 17, wherein
the characteristic detection unit is further configured to detect the characteristic parameter on a basis of at least one of a state of the operation area or a state of an operation object of when a predetermined operation is performed for the operation area in a case where the material of the operation area is not able to be recognized.

19. An information processing method comprising:
by an information processing apparatus,
detecting a characteristic of an operation area on a surface of a real object; and
selecting, from among a plurality of operation patterns, an operation pattern to be applied in the operation area on a basis of information indicating the characteristic of the operation area, wherein
the operation pattern includes a method of inputting operation data in the operation area.

20. A non-transitory computer-readable medium having embodied thereon a program, which when executed by a computer causes the computer to execute an information processing method, the method comprising:
detecting a characteristic of an operation area on a surface of a real object; and
selecting, from among a plurality of operation patterns, an operation pattern to be applied in the operation area on a basis of information indicating the characteristic of the operation area, wherein the operation pattern includes a method of inputting operation data in the operation area.

* * * * *